US011888610B2

(12) United States Patent
Kumar et al.

(10) Patent No.: US 11,888,610 B2
(45) Date of Patent: Jan. 30, 2024

(54) METHOD AND APPARATUS FOR POSITIONING WITH LTE-NR DYNAMIC SPECTRUM SHARING (DSS)

(71) Applicant: QUALCOMM Incorporated, San Diego, CA (US)

(72) Inventors: Akash Kumar, Hyderabad (IN); Amit Jain, San Diego, CA (US); Hargovind Prasad Bansal, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 64 days.

(21) Appl. No.: 17/171,668

(22) Filed: Feb. 9, 2021

(65) Prior Publication Data

US 2021/0266095 A1    Aug. 26, 2021

Related U.S. Application Data

(60) Provisional application No. 62/982,042, filed on Feb. 26, 2020.

(51) Int. Cl.
*H04L 1/00*    (2006.01)
*H04L 5/00*    (2006.01)
(Continued)

(52) U.S. Cl.
CPC .......... *H04L 1/0013* (2013.01); *H04L 5/0048* (2013.01); *H04W 16/14* (2013.01); *H04W 56/001* (2013.01); *H04W 72/0453* (2013.01)

(58) Field of Classification Search
CPC ... H04L 1/0013; H04L 5/0048; H04L 1/0045; H04L 1/0067; H04L 1/0075;
(Continued)

(56) References Cited

U.S. PATENT DOCUMENTS

2012/0046030 A1\* 2/2012 Siomina ................ G01S 1/042
 455/423
2014/0274104 A1\* 9/2014 Amanna, III ......... H04W 64/00
 455/454

(Continued)

OTHER PUBLICATIONS

Ericsson: "DL Reference Signals for NR Positioning", 3GPP TSG-RAN WG1 Meeting #99, 3GPP Draft; R1-1913135, 3rd Generation Partnership Project (3GPP), Mobile Competence Centre; 650, Route Des Lucioles; F-06921 Sophia-Antipolis Cedex; France, vol. RAN WG1, No. Reno, NV, USA; Nov. 18, 2019-Nov. 22, 2019, Nov. 8, 2019 (Nov. 8, 2019), pp. 1-26, XP051820323, Retrieved from the Internet: URL: https://ftp.3gpp.org/tsg_ran/WG1_RL1/TSGR1_99/Docs/R1-1913135.zip R1-1913135 DL reference signals for NR positioning.docx [retrieved on Nov. 8, 2019] sections 1-2.

(Continued)

*Primary Examiner* — Ajit Patel
*Assistant Examiner* — Wilfred Thomas
(74) *Attorney, Agent, or Firm* — Procopio, Cory, Hargreaves & Savitch LLP

(57) ABSTRACT

A user equipment (UE) is configured to be connected to a 5G New Radio (NR) network that shares one or more frequency bands using dynamic spectrum sharing (DSS) with a Long Term Evolution (LTE) network that is transmitting LTE positioning reference signal (PRS). The UE may receive LTE PRS rate matching information from the NR network, such as the LTE PRS configuration data or an LTE PRS rate matching pattern. The UE may decode and process NR data signals and control signals transmitted by the NR network while LTE PRS is transmitted by rate matching around the LTE PRS in accordance with the LTE PRS rate matching information. The LTE PRS muting pattern may be adjusted based on NR data or control signals, and the UE may receive and process NR data and control signals transmitted while the LTE PRS is muted.

26 Claims, 12 Drawing Sheets

(51) Int. Cl.
*H04W 16/14* (2009.01)
*H04W 56/00* (2009.01)
*H04W 72/0453* (2023.01)

(58) Field of Classification Search
CPC ... H04L 5/0064; H04L 5/0032; H04L 5/0042; H04L 5/0094; H04W 16/14; H04W 56/001; H04W 72/0453; H04W 4/021; H04W 64/00
See application file for complete search history.

(56) References Cited

U.S. PATENT DOCUMENTS

| | | | | |
|---|---|---|---|---|
| 2016/0254888 | A1* | 9/2016 | Nagata | H04L 5/0035 370/329 |
| 2017/0257774 | A1 | 9/2017 | Ghosh et al. | |
| 2018/0192404 | A1 | 7/2018 | Maaref et al. | |
| 2020/0021998 | A1* | 1/2020 | Baldemair | H04W 16/14 |
| 2020/0107209 | A1* | 4/2020 | Ratasuk | H04W 4/02 |
| 2020/0382247 | A1* | 12/2020 | Kwak | H04L 5/0094 |
| 2020/0408871 | A1* | 12/2020 | Da | G01S 5/10 |
| 2021/0007125 | A1* | 1/2021 | Qi | H04W 72/1273 |
| 2021/0120522 | A1* | 4/2021 | Kim | H04W 72/0453 |
| 2021/0288705 | A1* | 9/2021 | Lee | H04B 17/382 |
| 2021/0297216 | A1* | 9/2021 | Shreevastav | G01S 1/20 |
| 2021/0410097 | A1* | 12/2021 | Munier | H04L 5/0048 |
| 2022/0038231 | A1* | 2/2022 | Tao | H04L 5/0048 |
| 2022/0132509 | A1* | 4/2022 | Huss | H04W 72/0453 |
| 2022/0174641 | A1* | 6/2022 | Cha | H04L 5/0094 |
| 2022/0283259 | A1* | 9/2022 | Tao | G01S 5/0205 |
| 2022/0322105 | A1* | 10/2022 | Ren | H04W 24/10 |
| 2023/0085580 | A1* | 3/2023 | Kakishima | H04W 72/1273 370/329 |

OTHER PUBLICATIONS

International Search Report and Written Opinion—PCT/US2021/017465—ISA/EPO—dated May 10, 2021.
Ericsson: "Procedures for NR Positioning", 3GPP TSG-RAN WG1 Meeting #99, R1-1913138, Reno, NV, USA, Nov. 18-22, 2019, 5 Pages.

* cited by examiner

METHOD AND APPARATUS FOR POSITIONING WITH LTE-NR DYNAMIC SPECTRUM SHARING (DSS)

CLAIM OF PRIORITY UNDER 35 U.S.C. § 119

This application claims under 35 USC § 119 the benefit of and priority to U.S. Provisional Application No. 62/982,042, filed Feb. 26, 2020, and entitled "POSITIONING IN LTE-NR DYNAMIC SPECTRUM SHARING (DSS) SCENARIOS," which is assigned to the assignee hereof and is incorporated herein by reference in its entirety.

BACKGROUND

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems, a positioning engine, e.g., a location server, or a UE may determine a position or location of a supported UE using, e.g., positioning measurements derived from base stations in the wireless network to which the UE is connected. The information may be associated with UE based positioning techniques or UE-assisted positioning techniques. These methods may support various location services (for example, navigation systems, emergency communications), and supplement one or more additional location systems supported by wireless communications devices (such as global positioning system (GPS) technology).

SUMMARY

A user equipment (UE) is configured to be connected to a 5G New Radio (NR) network that shares one or more frequency bands using dynamic spectrum sharing (DSS) with a Long Term Evolution (LTE) network that is transmitting LTE positioning reference signal (PRS). The UE may receive LTE PRS rate matching information from the NR network, such as the LTE PRS configuration data or an LTE PRS rate matching pattern. The UE may decode and process NR data signals and control signals transmitted by the NR network while LTE PRS is transmitted by rate matching around the LTE PRS in accordance with the LTE PRS rate matching information. The LTE PRS muting pattern may be adjusted based on NR data or control signals, and the UE may receive and process NR data and control signals transmitted while the LTE PRS is muted.

In one implementation, a method for wireless communications performed by a user equipment (UE) connected to a New Radio (NR) network, includes receiving, from an entity in the NR network, Long Term Evolution (LTE) positioning reference signal (PRS) rate matching information for LTE PRS transmitted by a base station in an LTE network in one or more frequency bands shared by the NR network using dynamic spectrum sharing (DSS); receiving NR data signals and control signals transmitted by the base station in the NR network and LTE PRS transmitted by the base station in the LTE network on the one or more frequency bands; and decoding and processing the NR data signals and control signals from the base station in the NR network by rate matching around the LTE PRS in accordance with the LTE PRS rate matching information.

In one implementation, a user equipment (UE) configured for wireless communications with a New Radio (NR) network, includes a wireless transceiver configured to wirelessly communicate with network entities in a wireless communication system; at least one memory; at least one processor coupled to the wireless transceiver and the at least one memory, wherein the at least one processor is configured to: receive, from an entity in the NR network via the wireless transceiver, Long Term Evolution (LTE) positioning reference signal (PRS) rate matching information for LTE PRS transmitted by a base station in an LTE network in one or more frequency bands shared by the NR network using dynamic spectrum sharing (DSS); receive, via the wireless transceiver, NR data signals and control signals transmitted by the base station in the NR network and LTE PRS transmitted by the base station in the LTE network on the one or more frequency bands; and decode and process the NR data signals and control signals from the base station in the NR network by rate matching around the LTE PRS in accordance with the LTE PRS rate matching information.

In one implementation, a user equipment (UE) configured for wireless communications with a New Radio (NR) network, includes means for receiving, from an entity in the NR network, Long Term Evolution (LTE) positioning reference signal (PRS) rate matching information for LTE PRS transmitted by a base station in an LTE network in one or more frequency bands shared by the NR network using dynamic spectrum sharing (DSS); means for receiving NR data signals and control signals transmitted by the base station in the NR network and LTE PRS transmitted by the base station in the LTE network on the one or more frequency bands; and means for decoding and processing the NR data signals and control signals from the base station in the NR network by rate matching around the LTE PRS in accordance with the LTE PRS rate matching information.

In one implementation, a non-transitory storage medium including program code stored thereon, the program code is operable to configure at least one processor in a user equipment (UE) configured for wireless communications with a New Radio (NR) network, includes program code to receive, from an entity in the NR network, Long Term Evolution (LTE) positioning reference signal (PRS) rate matching information for LTE PRS transmitted by a base station in an LTE network in one or more frequency bands shared by the NR network using dynamic spectrum sharing (DSS); program code to receive NR data signals and control signals transmitted by the base station in the NR network and LTE PRS transmitted by the base station in the LTE network on the one or more frequency bands; and program code to decode and processing the NR data signals and control signals from the base station in the NR network by rate matching around the LTE PRS in accordance with the LTE PRS rate matching information.

In one implementation, a method for wireless communications performed by a user equipment (UE) connected to a New Radio (NR) network, includes transmitting an indication to an entity in the NR network that the UE does not support rate matching around Long Term Evolution (LTE) positioning reference signals (PRS) transmitted by a base station in an LTE network in one or more frequency bands shared by the NR network using dynamic spectrum sharing (DSS); receiving a muting pattern for the LTE PRS; and receiving NR data signals and control signals transmitted by a base station in the NR network while the LTE PRS transmitted by the base station in the LTE network is muted.

In one implementation, a user equipment (UE) configured for wireless communications with a New Radio (NR) network, includes a wireless transceiver configured to wirelessly communicate with network entities in a wireless communication system; at least one memory; at least one processor coupled to the wireless transceiver and the at least one memory, wherein the at least one processor is configured to: transmit, via the wireless transceiver, an indication to an entity in the NR network that the UE does not support rate matching around Long Term Evolution (LTE) positioning reference signals (PRS) transmitted by a base station in an LTE network in one or more frequency bands shared by the NR network using dynamic spectrum sharing (DSS); receive, via the wireless transceiver, a muting pattern for the LTE PRS; and receive, via the wireless transceiver, NR data signals and control signals transmitted by a base station in the NR network while the LTE PRS transmitted by the base station in the LTE network is muted.

In one implementation, a user equipment (UE) configured for wireless communications with a New Radio (NR) network, includes means for transmitting an indication to an entity in the NR network that the UE does not support rate matching around Long Term Evolution (LTE) positioning reference signals (PRS) transmitted by a base station in an LTE network in one or more frequency bands shared by the NR network using dynamic spectrum sharing (DSS); means for receiving a muting pattern for the LTE PRS; and means for receiving NR data signals and control signals transmitted by a base station in the NR network while the LTE PRS transmitted by the base station in the LTE network is muted.

In one implementation, a non-transitory storage medium including program code stored thereon, the program code is operable to configure at least one processor in a user equipment (UE) configured for wireless communications with a New Radio (NR) network, includes program code to transmit an indication to an entity in the NR network that the UE does not support rate matching around Long Term Evolution (LTE) positioning reference signals (PRS) transmitted by a base station in an LTE network in one or more frequency bands shared by the NR network using dynamic spectrum sharing (DSS); program code to receive a muting pattern for the LTE PRS; and program code to receive NR data signals and control signals transmitted by a base station in the NR network while the LTE PRS transmitted by the base station in the LTE network is muted.

In one implementation, a method for wireless communications performed by an entity in a New Radio (NR) network connected to a New Radio (NR) network, includes obtaining, from an entity in a Long Term Evolution (LTE) network, LTE positioning reference signal (PRS) configuration data for LTE PRS transmitted in one or more frequency bands shared by a base station in the NR network using dynamic spectrum sharing (DSS); transmitting, to a user equipment (UE) connected to the base station in the NR network, LTE PRS rate matching information for the LTE PRS transmitted in the one or more frequency bands shared by the base station in the NR network; transmitting NR data signals and control signals to the UE while LTE PRS is transmitted by a base station in the LTE network on the one or more frequency bands; wherein the UE receives and decodes the NR data signals and control signals by rate matching around the LTE PRS in accordance with the LTE PRS rate matching information.

In one implementation, an entity in a New Radio (NR) network connected to an entity in a Long Term Evolution (LTE) Network and a user equipment (UE), includes an external interface configured to communicate with network entities in a wireless communication system; at least one memory; at least one processor coupled to the external interface and the at least one memory, wherein the at least one processor is configured to: obtain, from the entity in the LTE network via the external interface, LTE positioning reference signal (PRS) configuration data for LTE PRS transmitted in one or more frequency bands shared by a base station in the NR network using dynamic spectrum sharing (DSS); transmit via the external interface, to the UE connected to the base station in the NR network, LTE PRS rate matching information for the LTE PRS transmitted in the one or more frequency bands shared by the base station in the NR network; transmit, via the external interface, NR data signals and control signals to the UE while the LTE PRS is transmitted by a base station in the LTE network on the one or more frequency bands; wherein the UE receives and decodes the NR data signals and control signals by rate matching around the LTE PRS in accordance with the LTE PRS rate matching information.

In one implementation, an entity in a New Radio (NR) network connected to an entity in a Long Term Evolution (LTE) Network and a user equipment (UE), includes means for obtaining, from an entity in a Long Term Evolution (LTE) network, LTE positioning reference signal (PRS) configuration data for LTE PRS transmitted in one or more frequency bands shared by a base station in the NR network using dynamic spectrum sharing (DSS); means for transmitting, to a user equipment (UE) connected to the base station in the NR network, LTE PRS rate matching information for the LTE PRS transmitted in the one or more frequency bands shared by the base station in the NR network; means for transmitting NR data signals and control signals to the UE while LTE PRS is transmitted by a base station in the LTE network on the one or more frequency bands; wherein the UE receives and decodes the NR data signals and control signals by rate matching around the LTE PRS in accordance with the LTE PRS rate matching information.

In one implementation, a non-transitory storage medium including program code stored thereon, the program code is operable to configure at least one processor in an entity in a New Radio (NR) network connected to an entity in a Long Term Evolution (LTE) Network and a user equipment (UE), includes program code to obtain, from an entity in a Long Term Evolution (LTE) network, LTE positioning reference signal (PRS) configuration data for LTE PRS transmitted in one or more frequency bands shared by a base station in the NR network using dynamic spectrum sharing (DSS); program code to transmit, to a user equipment (UE) connected to the base station in the NR network, LTE PRS rate matching information for the LTE PRS transmitted in the one or more frequency bands shared by the base station in the NR network; program code to transmit NR data signals and control signals to the UE while LTE PRS is transmitted by a base station in the LTE network on the one or more frequency bands; wherein the UE receives and decodes the NR data signals and control signals by rate matching around the LTE PRS in accordance with the LTE PRS rate matching information.

In one implementation, a method for wireless communications performed by an entity in a New Radio (NR) network connected to a New Radio (NR) network, includes receiving an indication from a user equipment (UE) connected to the NR network that the UE does not support rate matching around Long Term Evolution (LTE) positioning reference signals (PRS) transmitted in one or more frequency bands shared by the NR network using dynamic spectrum sharing (DSS); scheduling data transmissions and control transmissions from a base station in the NR network for when the LTE PRS is muted; sending a muting pattern for the LTE PRS to the UE; and transmitting NR data signals and control signals to the UE while the LTE PRS transmitted by the base station in the LTE network is muted.

In one implementation, an entity in a New Radio (NR) network connected to an entity in a Long Term Evolution (LTE) Network and a user equipment (UE), includes an external interface configured to communicate with network entities in a wireless communication system; at least one memory; at least one processor coupled to the external interface and the at least one memory, wherein the at least one processor is configured to: receive, via the external interface, an indication from the UE connected to the NR network that the UE does not support rate matching around LTE positioning reference signals (PRS) transmitted in one or more frequency bands shared by the NR network using dynamic spectrum sharing (DSS); schedule data transmissions and control transmissions from a base station in the NR network for when the LTE PRS is muted; send, via the external interface, a muting pattern for the LTE PRS to the UE; and transmit, via the external interface, NR data signals and control signals to the UE while the LTE PRS transmitted by the base station in the LTE network is muted.

In one implementation, an entity in a New Radio (NR) network connected to an entity in a Long Term Evolution (LTE) Network and a user equipment (UE), includes means for receiving an indication from a user equipment (UE) connected to the NR network that the UE does not support rate matching around Long Term Evolution (LTE) positioning reference signals (PRS) transmitted in one or more frequency bands shared by the NR network using dynamic spectrum sharing (DSS); means for scheduling data transmissions and control transmissions from a base station in the NR network for when the LTE PRS is muted; means for sending a muting pattern for the LTE PRS to the UE; and means for transmitting NR data signals and control signals to the UE while the LTE PRS transmitted by the base station in the LTE network is muted.

In one implementation, a non-transitory storage medium including program code stored thereon, the program code is operable to configure at least one processor in an entity in a New Radio (NR) network connected to an entity in a Long Term Evolution (LTE) Network and a user equipment (UE), includes program code to receive an indication from a user equipment (UE) connected to the NR network that the UE does not support rate matching around Long Term Evolution (LTE) positioning reference signals (PRS) transmitted in one or more frequency bands shared by the NR network using dynamic spectrum sharing (DSS); program code to schedule data transmissions and control transmissions from a base station in the NR network for when the LTE PRS is muted; program code to send a muting pattern for the LTE PRS to the UE; and program code to transmit NR data signals and control signals to the UE while the LTE PRS transmitted by the base station in the LTE network is muted.

BRIEF DESCRIPTION OF THE DRAWINGS

Like reference symbols in the various drawings indicate like elements, in accordance with certain example implementations. In addition, multiple instances of an element may be indicated by following a first number for the element with a letter or a hyphen and a second number.

DETAILED DESCRIPTION

Figure 1:
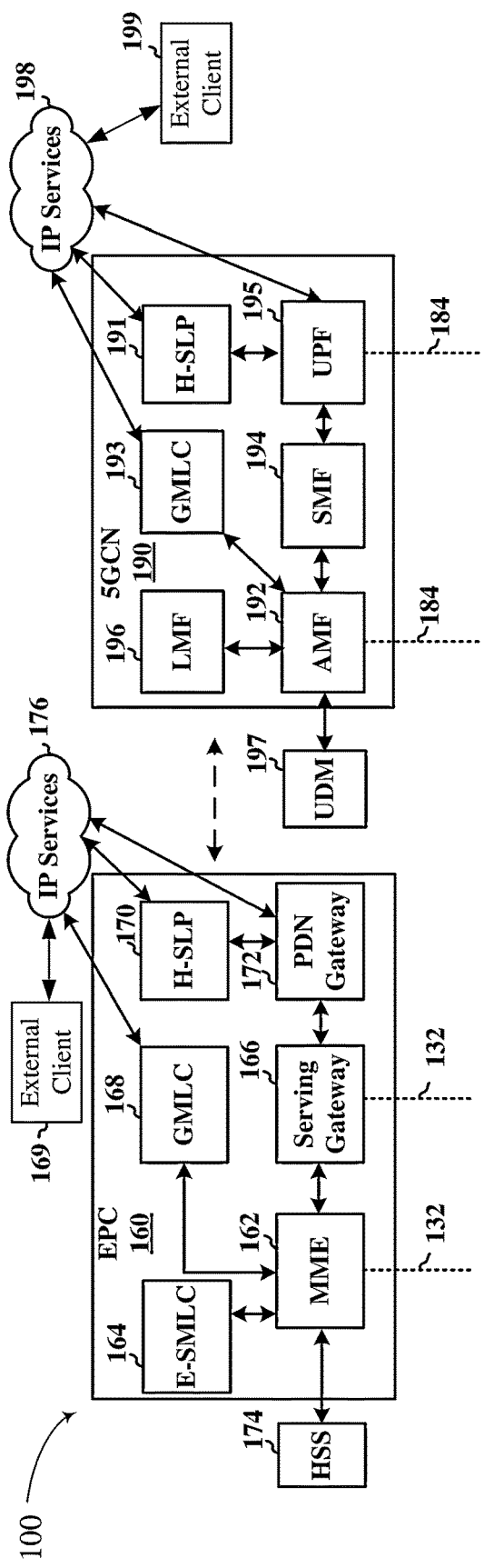
FIG. 1 shows a diagram illustrating an example of a wireless communications system including multiple separate wireless networks.
Figure 1:
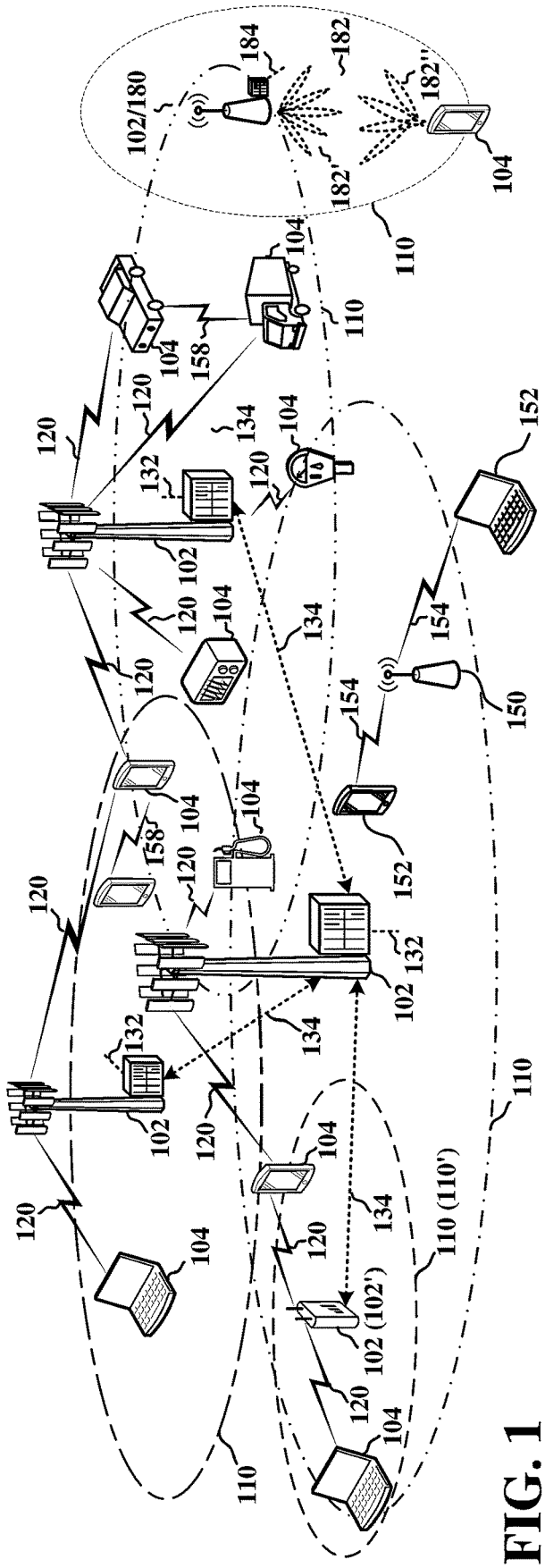

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as code-division multiple access (CDMA), time-division multiple access (TDMA), frequency-division multiple access (FDMA), orthogonal frequency-division multiple access (OFDMA), single-carrier FDMA (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 2GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., 5th Generation (5G) New Radio (NR) operating in mmWave bands) network.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

To meet the growing demands for expanded connectivity, wireless communication technologies or RATs are advancing from the LTE technology, sometimes referred to as 4G, to a next generation NR technology, sometimes referred to as 5G NR. For example, 5G NR may provide lower latency and a higher bandwidth or throughput then LTE. 5G NR is beginning to be deployed in markets where LTE is established. Deployment of 5G NR is being considered using both re-farmed and new frequency bands.

A mechanism that may be used to accelerate the deployment of 5G NR into markets already served by LTE is downlink (DL) spectrum sharing in the time domain or frequency domain. The sharing of DL spectrum may be dynamic, e.g., based on LTE and 5G NR traffic distribution, and is sometimes referred to as Dynamic Spectrum Sharing (DSS). DSS permits 5G NR to be deployed and co-exist effectively with 4G LTE in the same frequency band. Using DSS, a mobile operator may flexibly allocate existing spectrum across frequency bands by dynamically switching between 4G LTE and 5G NR coverage based on traffic demand.

The use of DSS provides several benefits. For example, multiplexing of resources in the time domain or frequency domain may improve bandwidth utilization efficiency. With DSS, the time a UE may utilize 5G NR may increase thereby minimizing the usage of Inter Radio Access Technology (IRAT) to handover to LTE. Further, LTE networks typically have an excess capacity, and thus, the impact of DSS on LTE may be minimized Additionally, there is a lack of low-band frequencies for 5G NR without LTE re-farming and there is limited 5G NR coverage in high-band frequencies.

Current implementation of DSS effectively handles regularly scheduled signal types, such as Cell-Specific Reference Signal (CRS) in LTE and Physical Downlink Shared Channel (PDSCH) in 5G NR. One type of LTE signal, however, that is not regularly scheduled but is specifically configured as needed, is Positioning Reference Signals (PRS). Because PRS is configured as necessary and is not a regularly scheduled signal type, current LTE-NR DS S techniques cannot accommodate PRS.

Implementations are described herein to permit the continued use of PRS for positioning in LTE, e.g., on shared frequency bands with LTE and 5G NR deployed using DSS.

FIG. 1 shows a diagram illustrating an example of a wireless communications system 100 including multiple separate wireless networks. The wireless communications system (also referred to as a wireless wide area network (WWAN)) includes base stations 102, UEs 104, an Evolved Packet Core (EPC) 160 (sometimes referred to as an LTE network 160), and a 5G Core (5GC) network 190 (sometimes referred to as the 5G NR network 190. The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with 5GC 190 through backhaul links 184 (e.g., N2, N3, or other interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 within a same wireless network may communicate directly or indirectly (e.g., through the EPC 160 or 5GC 190) with each other over backhaul links 134 (e.g., X2, Xn, or other interface) either directly or indirectly (for example, via a core network or intermediate base stations). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The term "cell" refers to a logical communication entity used for communication with a base station 102 (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area 110 (for example, a sector) over which the logical entity operates.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180, may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as a millimeter wave or mmW base station. Extremely high frequency (EHF) is part of the RF in the electromagnetic spectrum. EHF has a range of 20 GHz to 200 GHz and a wavelength between 1 millimeter and 10 millimeters. Radio waves in the band may be referred to as a millimeter wave. Near mmW may extend down to a frequency of 2 GHz with a wavelength of 100 millimeters. The super high frequency (SHF) band extends between 2 GHz and 20 GHz, also referred to as centimeter wave. Communications using the mmW/near mmW radio frequency band (e.g., 2 GHz-200 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The core networks 160/190 may provide user authentication, access authorization, tracking, Internet Protocol (IP) connectivity, positioning and other access, routing, or mobility functions.

The EPC 160, by way of example, may include a Mobility Management Entity (MME) 162, an Enhanced Serving Mobile Location Center (E-SMLC) 164, a Serving Gateway 166, a Gateway Mobile Location Center (GMLC) 168, a Home Secure User Plane Location (SUPL) Location Platform (H-SLP) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. The E-SMLC 164 may support location determination of the UEs, e.g., using the 3GPP control plane (CP) location solution. All user Internet protocol (IP) packets are transferred through the Serving Gateway 166, which itself is connected to the PDN Gateway 172. The PDN Gateway 172 provides UE IP address allocation as well as other functions. The PDN Gateway 172 is connected to the IP Services 176. The IP Services 176 may include the Internet, an intranet, an IP Multimedia Subsystem (IMS), a PS Streaming Service, and/or other IP services. The GMLC 168 may provide location access to the UE on behalf of external clients 169, e.g., that may be within or external to IP Services 176. The H-SLP 170 may support the SUPL User Plane (UP) location solution defined by the Open Mobile Alliance (OMA) and may support location services for UEs based on subscription information for the UEs stored in H-SLP 170.

The 5GC 190, by way of example, may include an Access and Mobility Management Function (AMF) 192, a Gateway Mobile Location Center (GMLC) 193, a Session Management Function (SMF) 194, a User Plane Function (UPF) 195, and a Location Management Function (LMF) 196. The AMF 192 may be in communication with a Unified Data Management (UDM) 197. The AMF 192 is the control node that processes the signaling between the UEs 104 and the 5GC 190 and which, for positioning functionality, may communicate with the LMF 196, which may support location determination of UEs. In some implementations, the LMF 196 may be co-located with a base station 105 in the NG-RAN and may be referred to as a Location Management Component (LMC). The GMLC 193 may be used to allow an external client 199, extern to or within IP Services 198, to receive location information regarding the UEs. All user Internet protocol (IP) packets may be transferred through the UPF 195. The UPF 195 provides UE IP address allocation as well as other functions. The UPF 195 is connected to the IP Services 198. The H-SLP 191 may likewise be connected to the IP services 198. The IP Services 198 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). Some of the UEs 104 may be referred to as Industrial Internet of Things (IIoT) devices, such as sensors, instruments, and other devices networked together, in an industrial application. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

A UE 104 may enter a connected state with a wireless communication network that may include a base station 102 for position determination. In one example, the UE 104 may communicate with a cellular communication network by transmitting wireless signals to or receiving wireless signals from a cellular base station. In another example, the UE 104 may communicate with a base station for a local area network (LAN), such as a Wi-Fi access point or other wireless network.

In particular implementations, the UE 104 may have circuitry and processing resources capable of obtaining location related measurements. Location related measurements obtained by UE 104 may include measurements of signals received from satellite vehicles belonging to a Satellite Positioning System (SPS) or Global Navigation Satellite System (GNSS) such as GPS, GLONASS, Galileo or Beidou and/or may include measurements of signals received from terrestrial base stations fixed at known locations (e.g., such as base stations 102 in FIG. 1). The UE 104 or location server (e.g., E-SMLC 164, H-SLP 170, or LMF 196), to which UE 104 may send the measurements, may then obtain a location estimate for the UE 104 based on these location related measurements using any one of several position methods such as, for example, GNSS, Assisted GNSS (A-GNSS), Advanced Forward Link Trilateration (AFLT), Observed Time Difference Of Arrival (OTDOA), WLAN (also referred to as WiFi) positioning, Angle of Departure (AOD), Angle of Arrival (AOA), multi-cell Round Trip signal propagation Time (multi-RTT), or Enhanced Cell ID (ECID) or combinations thereof. In some of these techniques (e.g., A-GNSS, AFLT and OTDOA), pseudoranges or timing differences may be measured at UE 104 relative to three or more terrestrial base stations 102 fixed at known locations based at least in part, on pilots, positioning reference signals (PRS) or other positioning related signals transmitted by the base stations 102 and received at the UE 104.

In some examples, the base stations 102 may transmit downlink positioning, such as PRS or Tracking Reference Signals. The positioning signal transmissions may be configured for a specific UE 104 to measure one or more parameters and use as part of UE based positioning technique or to report as part of a UE-assisted positioning technique. Similarly, the UE 104 may transmit positioning signal, such as uplink PRS or Sounding Reference Signals, and base stations 102 may measure one or more parameters to be used as part of UE based positioning technique or as part of a UE-assisted positioning technique. The PRS transmission and report parameter feedback may support various location services (for example, navigation systems, and emergency communications). In some examples, the report parameters supplement one or more additional location systems supported by the UE 104 (such as global positioning system (GPS) technology).

A base station 102 may configure a PRS transmission on one or more PRS resources of a channel. A PRS resource may span resource elements of multiple physical resource blocks (PRBs) within one or more OFDM symbols of a slot depending on a configured number of ports. For example, a PRS resource may span one symbol of a slot and contain one port for transmission. In any OFDM symbol, the PRS resources may occupy consecutive PRBs. In some examples, the PRS transmission may be mapped to consecutive OFDM symbols of the slot. In other examples, the PRS transmission may be mapped to interspersed OFDM symbols of the slot. Additionally, the PRS transmission may support frequency hopping within PRBs of the channel.

Aspects of wireless communications system 100 may include use of PRS transmissions by the base station 102 or sounding reference signal (SRS) transmissions by the UE 104 for UE location determination. For downlink-based UE location determination, a location server, e.g., a Location Management Function (LMF) in a NR network or a Secure User Plane Location (SUPL) Location Platform (SLP) in LTE, may be used to provide positioning assistance, such as PRS assistance data (AD) to the UE 104. In UE-assisted positioning, the location server may receive measurement reports from the UE 104 that indicates position measurements for one or multiple base stations 102 with which the location server may determine a position estimate for the UE 104, e.g., using OTDOA, or other desired techniques.

As discussed above, DSS may be used to flexibly allocate existing spectrum across frequency bands by dynamically switching between 4G LTE and 5G NR coverage based on, e.g., traffic demand.

Figure 2:
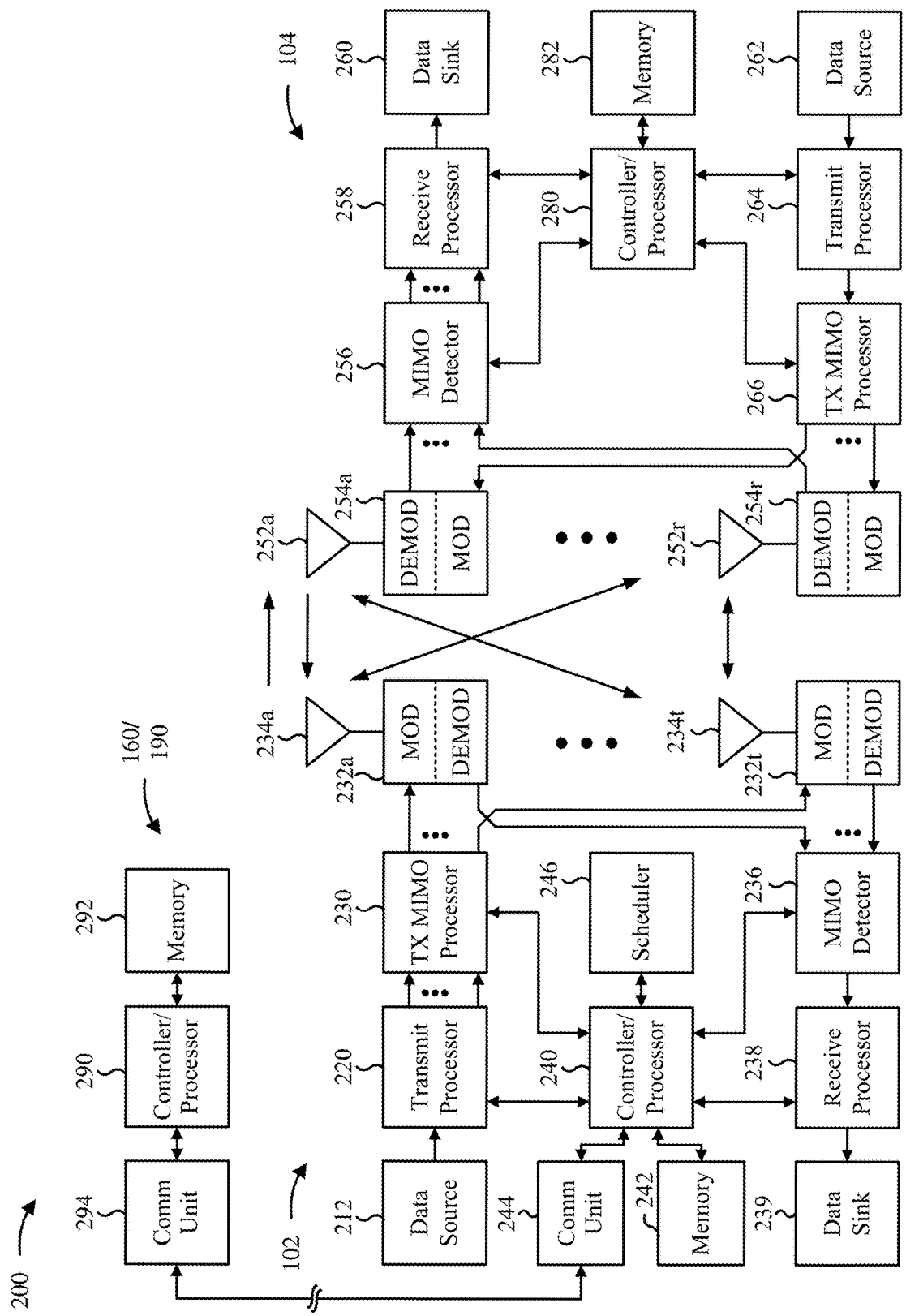
FIG. 2 shows a block diagram of a design of base station and UE.

FIG. 2 shows a block diagram of a design 200 of base station 102 and UE 104, which may be one of the base stations and one of the UEs in FIG. 1. Base station 102 may be equipped with T antennas 234a through 234t, and UE 104 may be equipped with R antennas 252a through 252r, where in general T≥1 and R≥1.

At base station 102, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 104, antennas 252a through 252r may receive the downlink signals from base station 102 and/or other base stations and may provide received signals to demodulators (DEMODs) 254a through 254r, respectively. Each demodulator 254 may condition (e.g., filter, amplify, down convert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 104 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 104 may be included in a housing.

On the uplink, at UE 104, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 102. At base station 102, the uplink signals from UE 104 and other UEs may be received by antennas 234, processed by demodulators 232, detected by a MIMO detector 236 if applicable, and further processed by a receive processor 238 to obtain decoded data and control information sent by UE 104. Receive processor 238 may provide the decoded data to a data sink 239 and the decoded control information to controller/processor 240. Base station 102 may include communication unit 244 and communicate to network controller 160/190 via communication unit 244. Network controller 160/190 may include communication unit 294, controller/processor 290, and memory 292.

Controller/processor 240 of base station 102, controller/processor 280 of UE 104, and/or any other component(s) of FIG. 2 may perform one or more techniques associated with reception of NR data and control signals by the UE 104 while LTE PRS is transmitted on shared spectrum using DSS, as described in more detail elsewhere herein. For example, controller/processor 240 of base station 102, controller/processor 280 of UE 104, and/or any other component(s) of FIG. 2 may perform or direct operations of, for example, processes 800, 900, 1000, and 1100 of FIGS. 8-11, and/or other processes as described herein. Memories 242 and 282 may store data and program codes for base station 102 and UE 104, respectively. In some aspects, memory 242 and/or memory 282 may comprise a non-transitory computer-readable medium storing one or more instructions for wireless communication. For example, the one or more instructions, when executed by one or more processors of the base station 102 and/or the UE 104, may perform or direct operations of, for example, processes 800, 900, 1000, and 1100 of FIGS. 8-11, and/or other processes as described herein. A scheduler 246 may schedule UEs for NR data and control transmissions on the downlink and/or uplink based on an LTE PRS rate matching pattern and/or LTE PRS muting pattern.

As indicated above, FIG. 2 is provided as an example. Other examples may differ from what is described with regard to FIG. 2.

5G NR networks are beginning to be deployed in areas where LTE networks are already established. Instead of acquiring new spectrum or refarming spectrum already in use, 5G NR may be adapted to coexist with LTE using the same spectrum using DSS. Using DSS, NR data and control signals may be transmitted on occupied frequency channels used by an LTE network, but in a manner that has little impact on the performance of the LTE network.

For example, multimedia broadcast signal frequency network (MBSFN) subframes may be used in order to provide gaps necessary for transmission of synchronization signal blocks (SSBs), which are used to by NR UE 104 to maintain synchronization in time and frequency with the 5G NR network 190.

Figure 3A:
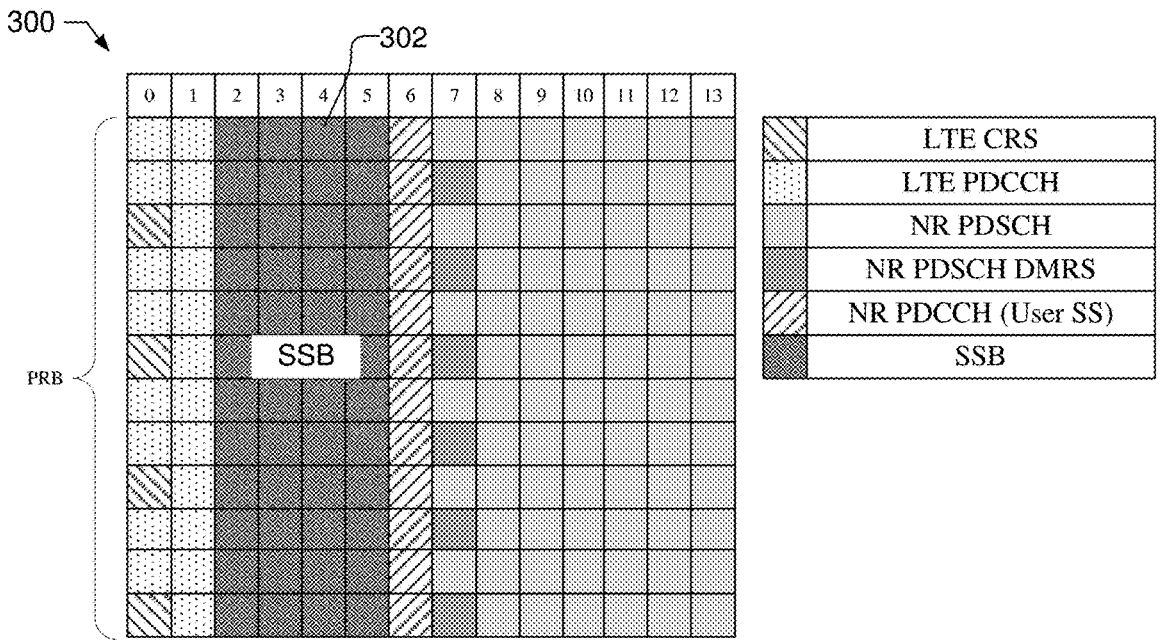
FIG. 3A illustrates a multimedia broadcast signal frequency network (MBSFN) subframe shared by an LTE network and an 5G NR network with Dynamic Spectrum Sharing (DSS).

FIG. 3A, for example, illustrates an MBSFN subframe 300 shared by an LTE network 160 and an 5G NR network 190 with NR SSB 302. The use of MBSFN subframes, however, is limited. For example, to limit impact on the performance of LTE, MBSFN subframes may be limited to a single subframe.

Accordingly, DSS additionally enables the use of subframes that are dedicated to LTE and not configured for MBSFN for 5G NR data and control messages. Standard LTE subframes include cell-specific reference signals (CRS) that are mapped to certain resource elements. An LTE connected UE uses CRS for channel estimation as well as to maintain time and frequency synchronization. Even in subframes where no LTE data is scheduled, LTE CRS will still be present. To enable 5G NR to use subframes with LTE CRS, rate-matching around LTE CRS is used.

Figure 3B:
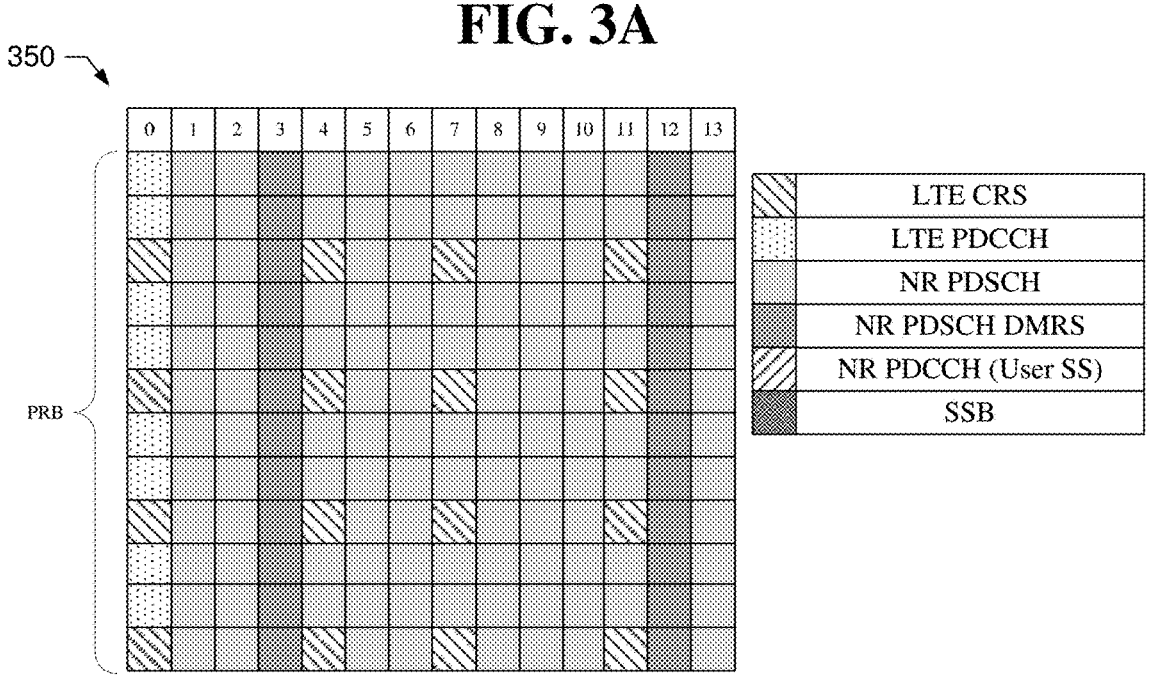
FIG. 3B illustrates a non-MBSFN subframe shared by an LTE network and an 5G NR network with DSS.

FIG. 3B, for example, illustrates a non-MBSFN subframe 350 that includes LTE CRS as well as NR data (PDSCH) that is rate matched around the LTE CRS. LTE CRS is a regularly transmitted signal, and, thus, only a few factors impact the rate matching algorithm. For example, an offset for subcarrier alignment and the number of antenna ports must be known. Additionally, as the CRS is cell specific, another factor for rate matching LTE CRS is $v_{shift}$, that represents the impact of the physical cell identity (PCI) ($v_{shift}$=PCI mod 6), which defines the starting point (subcarrier) for the mapping of the LTE sequence used for generating CRS. These factors may be conveyed to NR UE 104, e.g., using radio resource control (RRC) connection. Because these factors do not change over time, as long as the NR UE 104 is connected to the same cell, the NR UE 104 may perform rate matching around LTE CRS rate in each subframe.

The MBSFN subframe 300 and non-MBSFN subframe 350 illustrate specific subframes that may be used for NR when LTE is not present or mechanism that allows NR to transmit in LTE subframes that are not used by LTE but where essential LTE signals components, e.g., LTE CRS, are still sent. DSS additionally enables LTE and NR to share subframes in which both transmit control information (PDCCH and CORESET) and data (PDSCH). For example, the dynamic sharing of a subframe is possible through coordination of scheduling resources in the frequency and time domains at the medium access control layer in both base stations for the LTE network and 5G NR network 190.

Figure 3C:
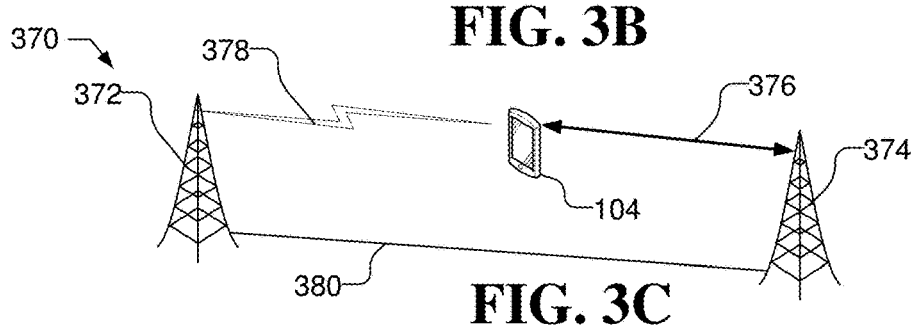
FIG. 3C illustrates a wireless communications system that includes base stations from an 5G NR network and an LTE network sharing the same spectrum using DSS, where the LTE network may transmit LTE positioning reference signals (PRS).

FIG. 3C, for example, illustrates a wireless communications system 370 that includes a base station 372, e.g., eNB, for an LTE network, a base station 374, e.g., gNB, for a 5G NR network, and NR UE 104. The eNB 372 and gNB 374 share the same spectrum using DSS. As illustrated by arrow 376, the NR UE 104 is connected to the gNB 374 to wirelessly receive NR control and data signals. As the gNB 374 and eNB 372 share spectrum via DSS, the eNB 372 transmits signals 378 on frequencies to which the NR UE 104 is tuned. In addition to the use the MBSFN subframe 300 and non-MBSFN subframe 350, discussed above, to enable coexistence of NR and LTE on the same spectrum, the gNB 374 and eNB 372, which operating with independent schedulers, may coordinate in a dual connectivity approach over the Xn interface 380. For example, the gNB 374 and eNB 372 may coordinate using bitmaps that provide a data traffic resource indication, e.g., indicating which PRBs reserved for LTE or not.

As discussed, because LTE CRS is a regularly transmitted signal that does not change, LTE CRS can be easily handled using DSS. LTE PRS signals, however, are not regularly transmitted, but are configured as needed. Accordingly, current DSS techniques cannot accommodate LTE PRS.

Figure 4:
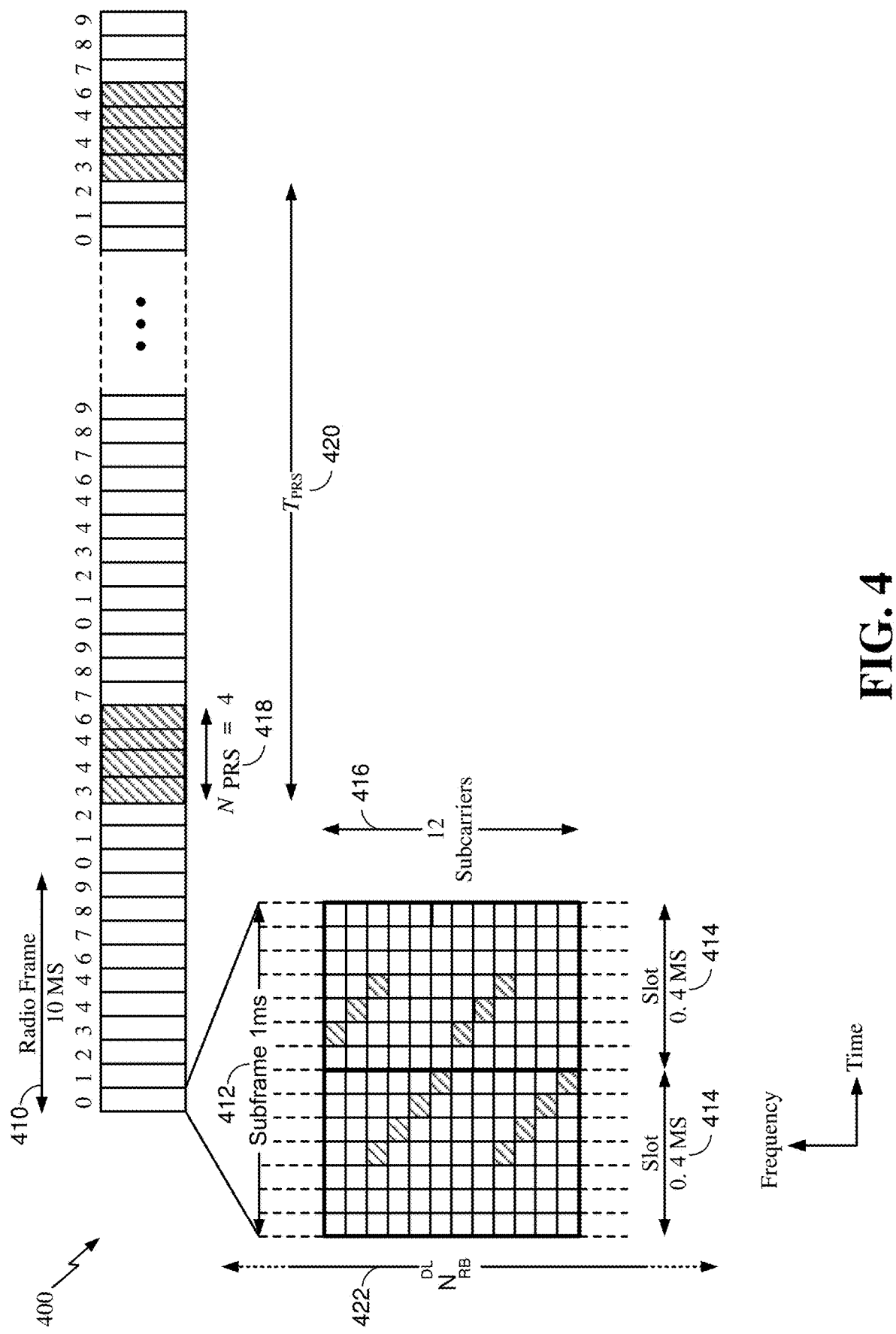
FIG. 4 is a diagram of a structure of an exemplary subframe sequence with positioning reference signal (PRS) positioning occasions.

FIG. 4 shows a structure of an exemplary subframe sequence 400 with positioning reference signal (PRS) positioning occasions, according to aspects of the disclosure. Subframe sequence 400 may be applicable to the broadcast of PRS signals from a base station (e.g., any of the base stations described herein) or other network node. The subframe sequence 400 may be used in LTE systems, and the same or similar subframe sequence may be used in other communication technologies/protocols, such as 5G and NR. In FIG. 4, time is represented horizontally (e.g., on the X axis) with time increasing from left to right, while frequency is represented vertically (e.g., on the Y axis) with frequency increasing (or decreasing) from bottom to top. As shown in FIG. 4, downlink and uplink radio frames 410 may be of 10 millisecond (ms) duration each. For downlink frequency division duplex (FDD) mode, radio frames 410 are organized, in the illustrated example, into ten subframes 412 of 1 ms duration each. Each subframe 412 comprises two slots 414, each of, for example, 0.5 ms duration.

In the frequency domain, the available bandwidth may be divided into uniformly spaced orthogonal subcarriers 416 (also referred to as "tones" or "bins"). For example, for a normal length cyclic prefix (CP) using, for example, 15 kHz spacing, subcarriers 416 may be grouped into a group of twelve (12) subcarriers. A resource of one OFDM symbol length in the time domain and one subcarrier in the frequency domain (represented as a block of subframe 412) is referred to as a resource element (RE). Each grouping of the 12 subcarriers 416 and the 14 OFDM symbols is termed a resource block (RB) and, in the example above, the number of subcarriers in the resource block may be written as $N_{SC}^{RB}=12$. For a given channel bandwidth, the number of available resource blocks on each channel 422, which is also called the transmission bandwidth configuration 422, is indicated as $N_{RB}^{DL}$. For example, for a 2 MHz channel bandwidth in the above example, the number of available resource blocks on each channel 422 is given by $N_{RB}^{DL}=15$. Note that the frequency component of a resource block (e.g., the 12 subcarriers) is referred to as a physical resource block (PRB).

A base station may transmit radio frames (e.g., radio frames 410), or other physical layer signaling sequences, supporting PRS signals (i.e., a downlink (DL) PRS) according to frame configurations either similar to, or the same as that, shown in FIG. 4, which may be measured and used for a UE (e.g., any of the UEs described herein) position estimation. Other types of wireless nodes (e.g., a distributed antenna system (DAS), remote radio head (RRH), UE, AP, etc.) in a wireless communications network may also be configured to transmit PRS signals configured in a manner similar to (or the same as) that depicted in FIG. 4.

A collection of resource elements that are used for transmission of PRS signals is referred to as a "PRS resource." The collection of resource elements can span multiple PRBs in the frequency domain and N (e.g., 1 or more) consecutive symbol(s) within a slot 414 in the time domain. For example, the cross-hatched resource elements in the slots 414 may be examples of two PRS resources. A "PRS resource set" is a set of PRS resources used for the transmission of PRS signals, where each PRS resource has a PRS resource identifier (ID). In addition, the PRS resources in a PRS resource set are associated with the same transmission-reception point (TRP). A PRS resource ID in a PRS resource set is associated with a single beam transmitted from a single TRP (where a TRP may transmit one or more beams). Note that this does not have any implications on whether the TRPs and beams from which signals are transmitted are known to the UE.

PRS may be transmitted in special positioning subframes that are grouped into positioning occasions. A PRS occasion is one instance of a periodically repeated time window (e.g., consecutive slot(s)) where PRS are expected to be transmitted. Each periodically repeated time window can include a group of one or more consecutive PRS occasions. Each PRS occasion can comprise a number $N_{PRS}$ of consecutive positioning subframes. The PRS positioning occasions for a cell supported by a base station may occur periodically at intervals, denoted by a number $T_{PRS}$ of milliseconds or subframes. As an example, FIG. 4 illustrates a periodicity of positioning occasions where $N_{PRS}$ equals 4 418 and $T_{PRS}$ is greater than or equal to 20 420. In some aspects, $T_{PRS}$ may be measured in terms of the number of subframes between the start of consecutive positioning occasions. Multiple PRS occasions may be associated with the same PRS resource configuration, in which case, each such occasion is referred to as an "occasion of the PRS resource" or the like.

A PRS may be transmitted with a constant power. A PRS can also be transmitted with zero power (i.e., muted). Muting, which turns off a regularly scheduled PRS transmission, may be useful when PRS signals between different cells overlap by occurring at the same or almost the same time. In this case, the PRS signals from some cells may be muted while PRS signals from other cells are transmitted (e.g., at a constant power). Muting may aid signal acquisition and time of arrival (TOA) and reference signal time difference (RSTD) measurement, by UEs, of PRS signals that are not muted (by avoiding interference from PRS signals that have been muted). Muting may be viewed as the non-transmission of a PRS for a given positioning occasion for a particular cell. Muting patterns (also referred to as muting sequences) may be signaled (e.g., using the LTE positioning protocol (LPP)) to a UE using bit strings. For example, in a bit string signaled to indicate a muting pattern, if a bit at position j is set to '0', then the UE may infer that the PRS is muted for a $j^{th}$ positioning occasion.

To further improve hearability of PRS, positioning subframes may be low-interference subframes that are transmitted without user data channels. As a result, in ideally synchronized networks, PRS may be interfered with by other cells' PRS with the same PRS pattern index (i.e., with the same frequency shift), but not from data transmissions. The frequency shift may be defined as a function of a PRS ID for a cell or other transmission point (TP) (denoted as $N_{ID}^{PRS}$) or as a function of a physical cell identifier (PCI) (denoted as $N_{ID}^{cell}$) if no PRS ID is assigned, which results in an effective frequency re-use factor of six (6).

To also improve hearability of a PRS (e.g., when PRS bandwidth is limited, such as with only six resource blocks corresponding to 1.4 MHz bandwidth), the frequency band for consecutive PRS positioning occasions (or consecutive PRS subframes) may be changed in a known and predictable manner via frequency hopping. In addition, a cell supported by a base station may support more than one PRS configuration, where each PRS configuration may comprise a distinct frequency offset (vshift), a distinct carrier frequency, a distinct bandwidth, a distinct code sequence, and/or a distinct sequence of PRS positioning occasions with a particular number of subframes ($N_{PRS}$) per positioning occasion and a particular periodicity ($T_{PRS}$). In some implementation, one or more of the PRS configurations supported in a cell may be for a directional PRS and may then have additional distinct characteristics, such as a distinct direction of transmission, a distinct range of horizontal angles, and/or a distinct range of vertical angles.

PRS is not transmitted by all cells and may not be transmitted in every subframe. A PRS configuration, as described above, including the PRS transmission/muting schedule, is signaled is provided to the UE to enable the UE to perform PRS positioning measurements. The UE is not expected to blindly perform detection of PRS configurations.

When a 5G NR network shares one or more frequency bands with an LTE network using DSS, regular transmissions by the LTE network, such as CRS, or by the 5G NR network, such as PDSCH, are known and can be accommodated by the DSS procedure. For example, an LTE CRS is a cell-specific reference signal that is mapped to resource elements spread through the resource grid in an identical pattern in every resource block. Thus, LTE CRS transmissions from a particular cell may be easily identified for each cell and accommodated by the DSS procedure.

Unlike LTE CRS, however, LTE PRS is not transmitted by all cells all the time, and if it is transmitted by a cell, it is not transmitted in every subframe. PRS transmissions are configuration based, e.g., PRS transmissions occur only in configured cells and only in configured subframes, not all subframes. Moreover, the mapping of the PRS to the resource elements in the resource grid is configured. Accordingly, unlike LTE CRS, LTE PRS is not predictable and regular and cannot be accommodated by current DSS techniques. Without knowledge of the LTE PRS configuration, NR UE 104 connected to a 5G NR network that shares spectrum with an LTE network using DSS will not know which cells are transmitting PRS, or which subframes or which resource elements within each resource block have been configured for PRS. For example, referring to FIG. 3C, without accommodating the LTE PRS, if UE 104 is receiving data signals or control signals from gNB 374 while eNB 372 is transmitting LTE PRS in signals 378, the UE 104 will not be able to properly decode the NR data or control signals in subframes in which LTE PRS is present.

Accordingly, in one implementation, the LTE PRS scheduling information is provided to UE 104 that is connected to the 5G NR network 190, so that the UE 104 may rate match the NR data around the LTE PRS transmissions. For example, a scheduler in the base station 102 of the 5G NR network 190 may receive the LTE PRS configuration and provide an LTE PRS rate matching pattern which provides the LTE PRS scheduling information to the UE 104, and the UE may use the LTE PRS rate matching pattern to rate match the NR data. In some implementations, the LTE PRS configuration may be provided to the UE 104, such as one or more of carrier frequency, carrier bandwidth, a number of consecutive PRS sub-frames, a PRS periodicity, a PRS configuration index, a muting pattern, or a combination thereof, and the UE 104 may determine the rate matching scheme for data transmissions from the 5G NR network based on the received LTE PRS configuration and may process the data transmissions from the 5G network around the LTE PRS transmissions. With knowledge of whether a subframe is configured to include an LTE PRS transmission, and which subcarriers in a subframe are configured to include PRS transmissions, the UE 104 may puncture subcarriers at specific times or resource elements with LTE PRS and receive the remaining resource elements subcarriers in a resource block. Thus, the UE 104 may use the PRS rate matching pattern and rate match the NR data signals, such as PDSCH and PDCCH, around the LTE PRS transmissions. As the LTE PRS is configured to specific subframes, slots and subcarriers, with knowledge of the LTE PRS configuration, the UE 104 may puncture only affected subframes, slots and subcarriers to receive the NR data. Moreover, the 5G NR network may schedule the NR data, such as PDSCH and PDCCH, according to the LTE PRS configuration.

Figure 5A:
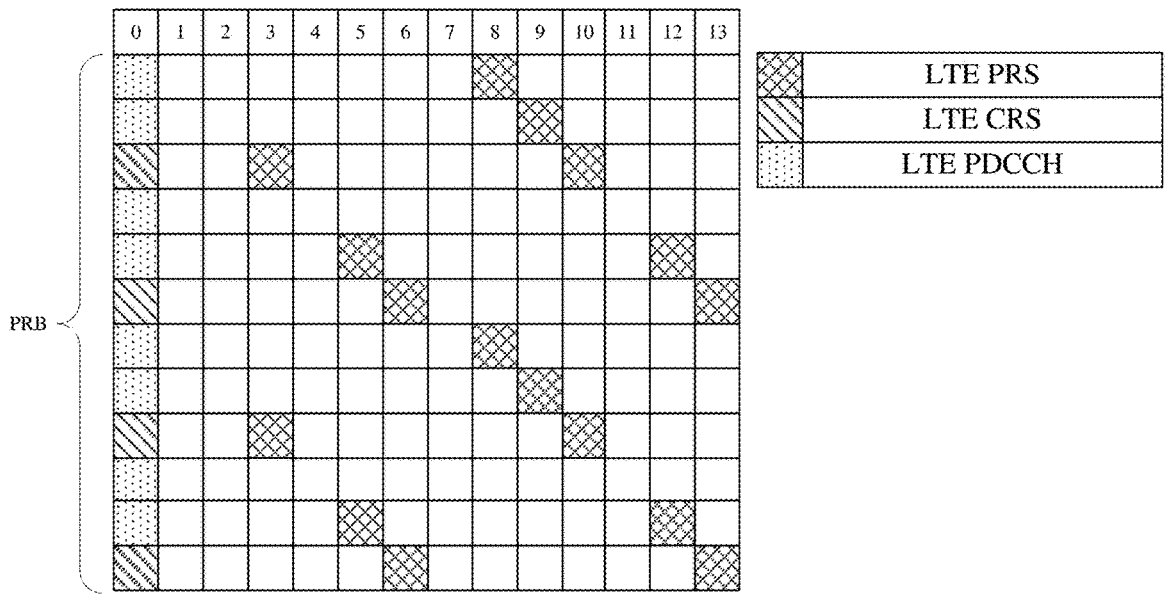
FIGS. 5A and 5B illustrates an LTE subframe and rate matched NR subframe that include LTE PRS and NR data that is rate matched around the LTE PRS.
Figure 5B:
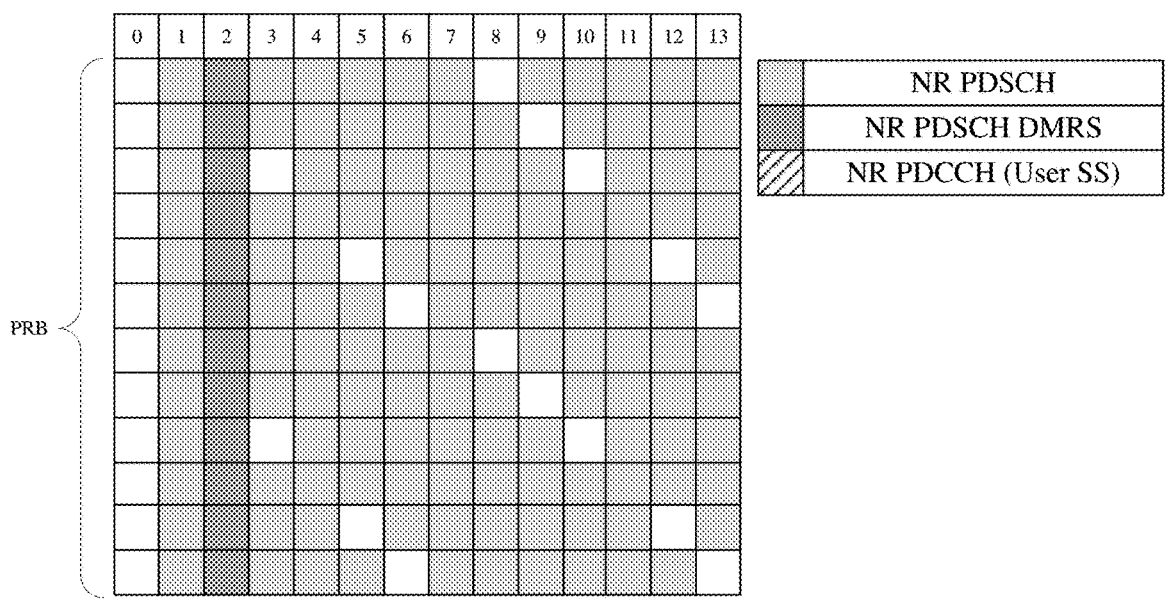

FIGS. 5A and 5B, for example, illustrate respectively an LTE subframe 500 and NR subframe 550 that is rate matched to the LTE subframe 500. The LTE subframe 500 includes LTE PRS, and the NR subframe 550 includes NR data (PDSCH) that is rate matched around the LTE PRS in the LTE subframe. The rate matching around the LTE PRS may be based on the UE 104 receiving a rate matching pattern from the 5G NR base station 102 and applying the rate matching pattern to the subframe to receive the NR data. In another implementation, the UE 104 may receive the LTE PRS configuration from the 5G NR base station 102 and may determine the corresponding rate matching pattern from the LTE PRS configuration and apply the rate matching pattern to the subframe to receive the NR data.

The UE 104 may provide its capability for rate matching around the LTE PRS transmissions to the 5G NR network. In some implementations, the 5G NR network may reject the connection setup for the UE 104 or use an RRC connection release if LTE PRS transmissions are configured for a frequency band in DSS mode and the NR data cannot be scheduled without rate matching. For example, it may not be possible to schedule the NR data either due to 4 symbol SSB constraints or excessive overhead to the NR data.

If a UE 104 does not have a capability to support PRS rate matching, the 5G NR network may schedule NR data restricted to Multicast-Broadcast Single Frequency Network (MBSFN) frames, so that NR data is not scheduled in non-MBSFN frames.

Additionally, the LTE network may adjust the muting pattern of the LTE PRS transmission in accordance with the Synchronization Signal Block (SSB) schedule of the 5G NR network, which may be shared with the UE 104 for rate matching accordingly in the muted subframes.

By way of example, as illustrated in Table 1, which is a fragment of Abstract Syntax Notation One (ASN.1), the UE 104 connected to a 5G NR network may include a capability of rate matching LTE PRS transmissions. For example, as illustrated in the table, the UE includes a capability of "rateMatchingLTE-PRS."

TABLE 1

```
-- ASN1START
-- TAG-RF-PARAMETERS-START
RF-Parameters ::=       SEQUENCE {
   < >
   ]]
}
BandNR ::=              SEQUENCE {
   bandNR                  FreqBandIndicatorNR,
   modifiedMPR-Behaviour   BIT STRING (SIZE (8))           OPTIONAL,
   < >
   ue-PowerClass           ENUMERATED {pc1, pc2, pc3, pc4} OPTIONAL,
   rateMatchingLTE-CRS     ENUMERATED {supported}          OPTIONAL,
   rateMatchingLTE-PRS     ENUMERATED {supported}          OPTIONAL,
   channelBWs-DL-v1530     CHOICE {
      fr1                     SEQUENCE {
         scs-15 kHz              BIT STRING (SIZE (10))          OPTIONAL,
         scs-30 kHz              BIT STRING (SIZE (10))          OPTIONAL,
         scs-60 kHz              BIT STRING (SIZE (10))          OPTIONAL
      },
      fr2              SEQUENCE {
         scs-60 kHz      BIT STRING (SIZE (3))    OPTIONAL,
         scs-120 kHz     BIT STRING (SIZE (3))       OPTIONAL
      }
}
```

As illustrated in Tables 2 and 3, which are a fragments of ASN.1, the 5G NR network may re-use a rate match pattern list to provide the PRS scheduling information to the UE 104. For example, Table 2 illustrates the PDSCH configuration includes the "rateMatchPatternToAddModList," and Table 3 illustrates a "RateMatchPattern."

TABLE 2

```
-- ASN1START
-- TAG-PDSCH-CONFIG-START
PDSCH-Config ::=              SEQUENCE {
    dataScramblingIdentityPDSCH      INTEGER (0..1023)        OPTIONAL, -- Need S
    < >
    pdsch-AggregationFactor          ENUMERATED { n2, n4, n8 } OPTIONAL, -- Need S
    rateMatchPatternToAddModList     SEQUENCE (SIZE (1..maxNrofRateMatchPatterns)) OF
RateMatchPattern
                                                              OPTIONAL, -- Need N
    rateMatchPatternToReleaseList    SEQUENCE (SIZE (1 .. maxNrofRateMatchPatterns))
OF RateMatchPatternId
                                                              OPTIONAL, -- Need N
    rateMatchPatternGroup1           Rate MatchPatternGroup   OPTIONAL, -- Need R
    rateMatchPatternGroup2           RateMatchPatternGroup
```

TABLE 3

```
-- ASN1START
-- TAG-RATEMATCHPATTERN-START
RateMatchPattern ::=          SEQUENCE {
    rateMatchPatternId            RateMatchPatternId,
    patternType                   CHOICE {
        bitmaps                       SEQUENCE {
            resourceBlocks                BIT STRING (SIZE (275)),
            symbolsInResource Block       CHOICE {
                oneSlot                       BIT STRING (SIZE (14)),
                twoSlots                      BIT STRING (SIZE (28))
            },
            periodicityAndPattern         CHOICE {
                n2                            BIT STRING (SIZE (2)),
                n4                            BIT STRING (SIZE (4)),
                n5                            BIT STRING (SIZE (5)),
                n8                            BIT STRING (SIZE (8)),
                n10                           BIT STRING (SIZE (10)),
                n20                           BIT STRING (SIZE (20)),
                n40                           BIT STRING (SIZE (40))
            }                             OPTIONAL, -- Need S
            ...
        },
        controlResourceSet            ControlResourceSetId
    },
    subcarrierSpacing             OPTIONAL, -- Cond CellLevel
    dummy                         ENUMERATED { dynamic, semiStatic },
    ...
}
-- TAG-RATEMATCHPATTERN-STOP
-- ASN1STOP
```

As illustrated in Tables 4 and 5, which are a fragments of ASN.1, the serving cell may be configured based on the PRS pattern to rate match NR PDSCH. For example, Table 4 illustrates the rate match pattern LTE-CRS may include "RateMatchPatternLTE-PRS" and Table 5 illustrates the serving cell configuration may include "lte-PRS-ToMatchAround." As can be seen, the rate matching pattern for LTE-PRS includes, e.g., the carrier DL frequency ("carrierFreqDL"), the carrier DL bandwidth ("carrierBandwidthDL"), the number of PRS (i.e., the number of consecutive PRS sub-frames) ("NPRS"), the PRS period "TPRS", and the muting pattern ("MUTINGPATTERN"), as well as a PRS configuration index.

TABLE 4

```
-- ASN1START
-- TAG-RATEMATCHPATTERNLTE-CRS-START
RateMatchPatternLTE-PRS ::= SEQUENCE {
    carrierFreqDL        INTEGER (0..16383),
    carrierBandwidthDL   ENUMERATED {n6, n15, n25, n50, n75, n100, spare2, spare1},
    NPRS                 INTEGER (0..4096),
    TPRS                 ENUMERATED {160 ms, 320 ms, 640 ms, 1280 ms},
    MUTINGPATTERN        BITSTRING{ }
}
-- TAG-RATEMATCHPATTERNLTE-CRS-STOP
-- ASN1STOP
```

TABLE 5

```
-- ASN1START
-- TAG-SERVINGCELLCONFIG-START
```

TABLE 5-continued

```
ServingCellConfig ::=          SEQUENCE {
    tdd-UL-DL-ConfigurationDedicated   TDD-UL-DL-ConfigDedicated  OPTIONAL, -- Cond TDD
    initialDownlinkBWP             BWP-DownlinkDedicated      OPTIONAL, -- Need M
< >
    servingCellMO              MeasObjectId           OPTIONAL, -- Cond MeasObject
    ...,
    [[
    lte-CRS-ToMatchAround          SetupRelease { RateMatchPatternLTE-CRS }
                                                       OPTIONAL, -- Need M
    lte-PRS-ToMatchAround          SetupRelease { RateMatchPatternLTE-PRS }
                                                       OPTIONAL, -- Need M
    rateMatchPatternToAddModList   SEQUENCE (SIZE (1 .. maxNrofRateMatchPatterns)) OF
    RateMatchPattern                                       OPTIONAL, -- Need N
```

In addition to, or as an alternative to, rate matching the NR data around the LTE PRS transmissions, the 5G NR base station may transmit NR SSB, which has a constraint of being transmitted in four consecutive symbols and/or NR data based on the muting pattern of the LTE PRS, e.g., NR SSB and/or data is transmitted in subframes or slots during which the LTE PRS is muted. For example, in some implementations, rate matching around the LTE PRS may not be possible, e.g., the UE 104 may not be capable of rate matching. In such circumstances, the 5G NR network, e.g., the scheduler in the 5G NR base station 102, may schedule NR data transmissions based on the LTE PRS muting schedule so that the NR data is transmitted while the LTE PRS is muted. In some implementations, the 5G NR base station may request the LTE base station, e.g., through the Xn interface, to adjust its muting pattern so that NR data may be transmitted.

Due to frequency differences, the 5G NR network 190 may require that at least two consecutive symbols of the LTE subframe in order to transmit four consecutive OFDM symbols, e.g., for SSB or NR data. For example, the 5G NR network may need at least two consecutive symbols at the LTE 15 KHz Sub-Carrier Spacing (SCS) rate so that the 5G NR 30 KHz SCS may be deployed in four consecutive OFDM symbols. Due to the high density of LTE PRS, however, along with other control signals, e.g., LTE CRS, that is transmitted, there may not be two consecutive symbols in an LTE subframe based on the SSB periodicity or it may require excessive overhead to the NR data. Accordingly, the 5G NR network 190 may request that the LTE network 160, e.g., through the schedulers in the respective base stations via the Xn interface, schedule the LTE PRS muting pattern so as to leave subframes available for the 5G NR network 190 to schedule SSB based. For example, the scheduler of the 5G NR base station may provide the SSB schedule to the scheduler of the LTE base station. The LTE network 160 may adjust the LTE PRS muting pattern accordingly, e.g., for subframes or slots where SSB is scheduled, the LTE PRS is muted so that SSB scheduling is possible in four consecutive OFDM symbols.

Figure 6:
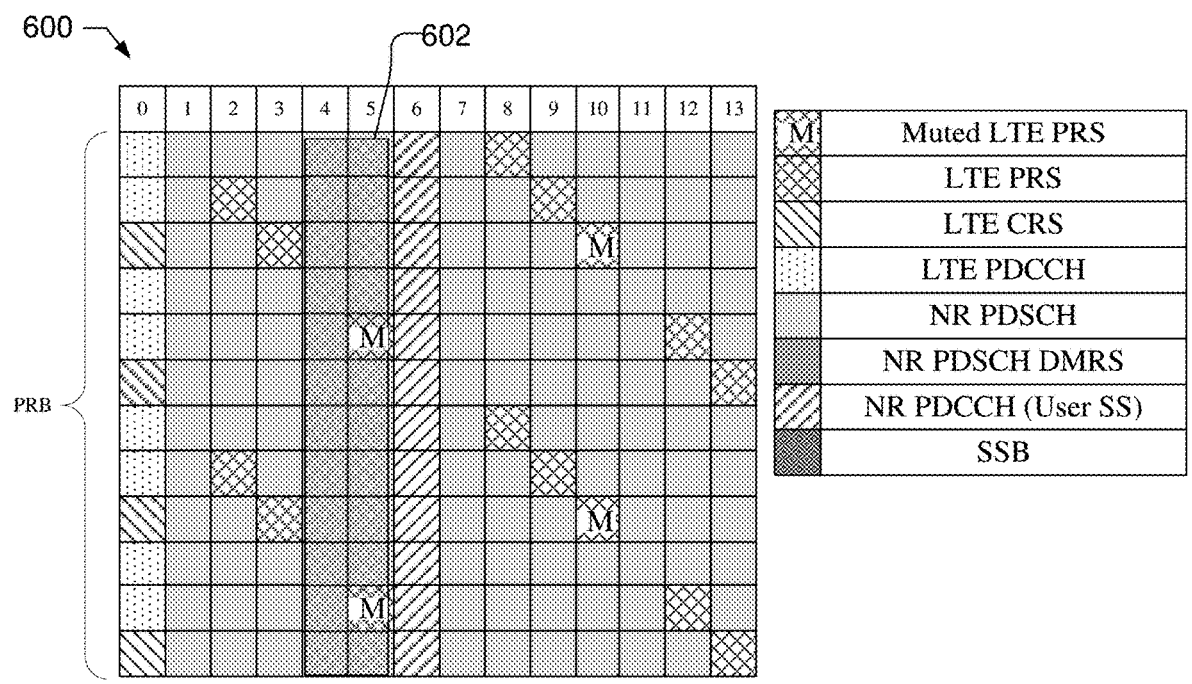
FIG. 6 illustrates an LTE subframe that includes LTE PRS and muted LTE PRS and shows overlying NR data rate matched around the LTE PRS and NR control signals transmitted while the LTE PRS is muted.

FIG. 6, for example, illustrates an LTE subframe 600 that includes LTE PRS as well as NR data (PDSCH) that is rate matched around the LTE PRS. FIG. 6, further illustrates muted LTE PRS, e.g., in symbols 5 and 10. As illustrated, by muting the LTE PRS in symbol 5, two consecutive symbols of the LTE subframe 600 are available for transmission of SSB 602, which due to the frequency difference is equivalent to four consecutive OFDM symbols in the NR subframe. The LTE subframe 600 further illustrates the NR PDCCH in symbol 6.

Thus, LTE PRS and NR PDSCH, SSB and PDCCH may co-exist using DSS, and is supported with no significant impact to LTE positioning and at the cost of little additional overhead to NR PDSCH.

Figure 7:
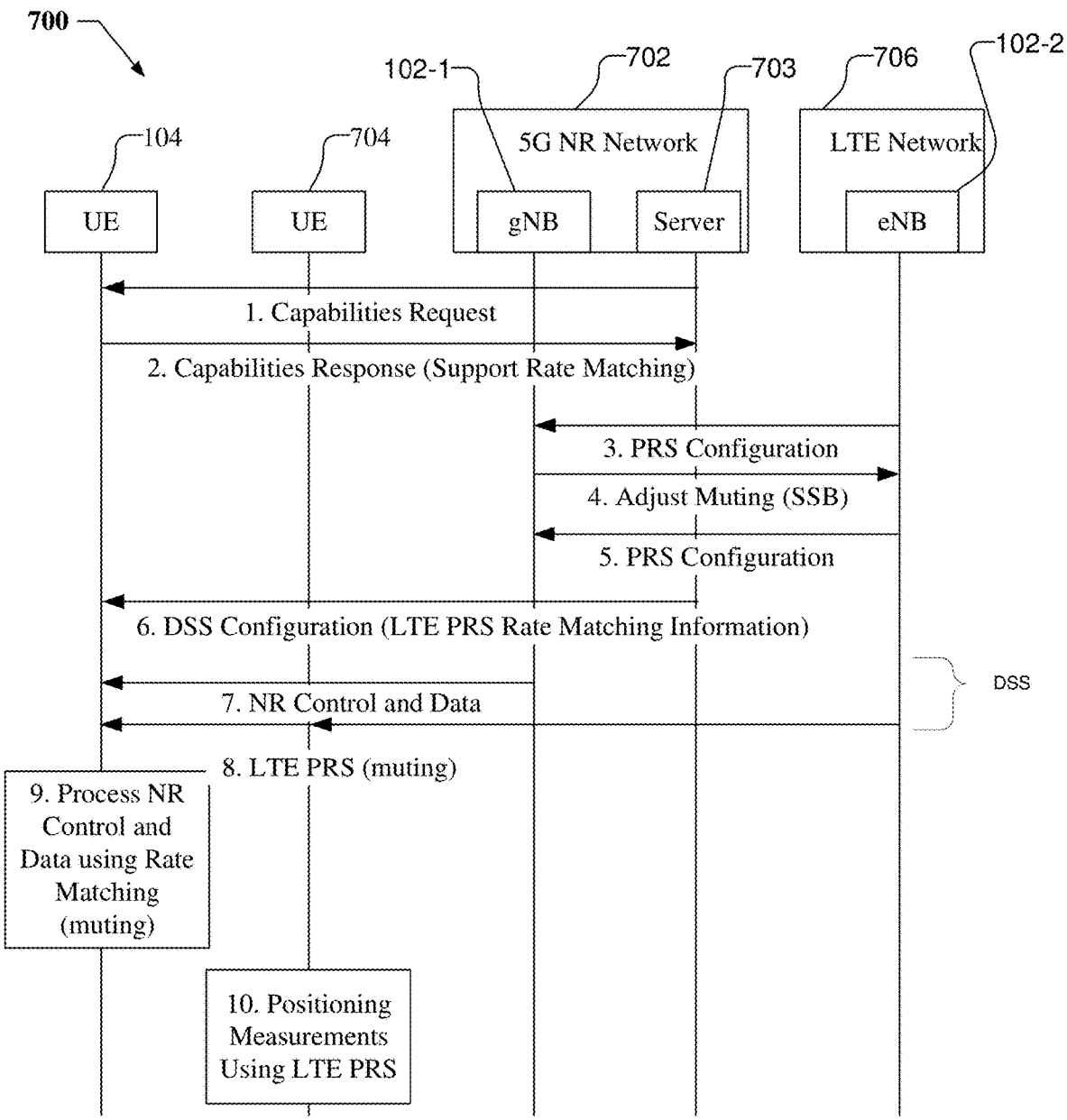
FIG. 7 illustrates a message flow illustrating communications between various components of a wireless communications systems that share one or more frequency bands using DSS.

FIG. 7 illustrates an example message flow 700 illustrating communications between various components of a wireless communications system, such as wireless communications system 100 discussed with reference to FIG. 1, including multiple wireless networks supporting wireless communications with a UE 104 and a second UE 704, which may be similar to UE 104. As mentioned previously, techniques disclosed herein are not necessarily limited to the architecture illustrated in FIG. 1. As illustrated, a 5G NR network 702, which may be, e.g., a cellular network such as a 5G NR network 190, includes gNB 102-1 and a server 703, which may be, e.g., LMF 196 shown in FIG. 1. An LTE network 706 may be, e.g., LTE network 160, and includes an eNB 102-2. The gNB 102-1 in 5G NR network 702 and eNB 102-2 in LTE network 706 share one or more frequency bands using DSS. The UE 104 is configured connect to the 5G NR network 702, while UE 704 is configured to connect to the LTE network 706. It should be understood that there may be one or more preliminary (and intervening) stages not shown in FIG. 7, for example, to support conventional communications or communications between entities within the same network, e.g., between gNB 102-1 and server 703 in 5G NR network 702.

At stage 1, the UE 104 may receive a capabilities request for the server 703 of the 5G NR network 702. The capabilities request, for example, may request the UE 104 ability to support DSS.

At stage 2, the UE 104 may provide a capability response to the server 703. For example, the UE 104 may indicate that the UE 104 is capable of supporting DSS. The UE 104 may further indicate whether the UE 104 is capable of supporting rate matching around LTE PRS.

At state 3, the eNB 102-2 from the LTE network 706 may provide its PRS configuration to the gNB 102-1 of the 5G NR network 702.

At stage 4, the gNB 102-1 may request that the eNB 102-2 adjust the muting pattern of the LTE PRS. For example, the muting pattern of the LTE PRS may be adjusted so that SSB scheduling by the gNB 102-1 is possible in four consecutive OFDM symbols in an NR subframe, which is equivalent to two consecutive symbols in the LTE subframe. The request to adjust the muting pattern, for example, may be due to the LTE PRS density, the SSB periodicity or to avoid excessive overhead to the NR data in order to transmit the SSB. Additionally, the muting pattern of the LTE PRS may be adjusted, e.g., if the UE 104 indicated that it does not support rate matching around LTE PRS, so that LTE PRS muting may be used to provide NR data to the UE 104.

At stage 5, the eNB 102-2 from the LTE network 706 may provide its PRS configuration to the gNB 102-1 of the 5G NR network 702 including any adjustments to the LTE PRS muting pattern.

At stage 6, the server 703 may provide the UE 104 with the DSS configuration information to enable the UE 104 to receive NR control and data signals from the gNB 102-1. For example, DSS configuration information may include LTE PRS rate matching information, such as an LTE PRS rate matching pattern or the LTE PRS configuration, such as one or more of carrier frequency, carrier bandwidth, a number of consecutive PRS sub-frames, a PRS periodicity, a PRS configuration index, a muting pattern, or a combination thereof, with which the UE 104 may determine the LTE PRS rate matching pattern. The LTE PRS rate matching information may include muting information. Additionally, the DSS configuration information may include, e.g., LTE CRS rate matching information.

At stage 7, the UE 104 receives NR control signals and data signals from the gNB 102-1. The NR control signals and data signals may be, e.g., at least one of physical downlink shared channel (PDSCH) transmissions and physical downlink common channel (PDCCH) transmissions or a combination thereof. In some implementations, the data transmissions and control transmissions may be scheduled for when the LTE PRS is muted.

At stage 8, while the UE 104 is receiving the NR control signals and data signals in stage 7, the eNB 102-2 transmits LTE PRS to UE 704. The LTE PRS is in the same spectrum as the NR control signals and data signals transmitted by gNB 102-1 and, accordingly, will be received by UE 104. Some of the LTE PRS transmitted by the eNB 102-2 may be muted.

At stage 9, the UE 104 decodes and processes the NR control and data signals received at stage 7, e.g., rating matching around the LTE PRS transmitted at stage 8. In some implementations, the LTE PRS may also be muted in stage 7 allowing reception of specific signals, such as SSB, or if the UE 104 is not capable of LTE PRS rate matching, allowing reception of NR control and data signals. If the UE 104 is not capable of LTE PRS rate matching, the UE 104 may further receive NR control and data signals UE 104, e.g., during MBSFN frames.

At stage 10, the UE 704 may perform positioning measurements with the LTE PRS received at stage 8.

Figure 8:
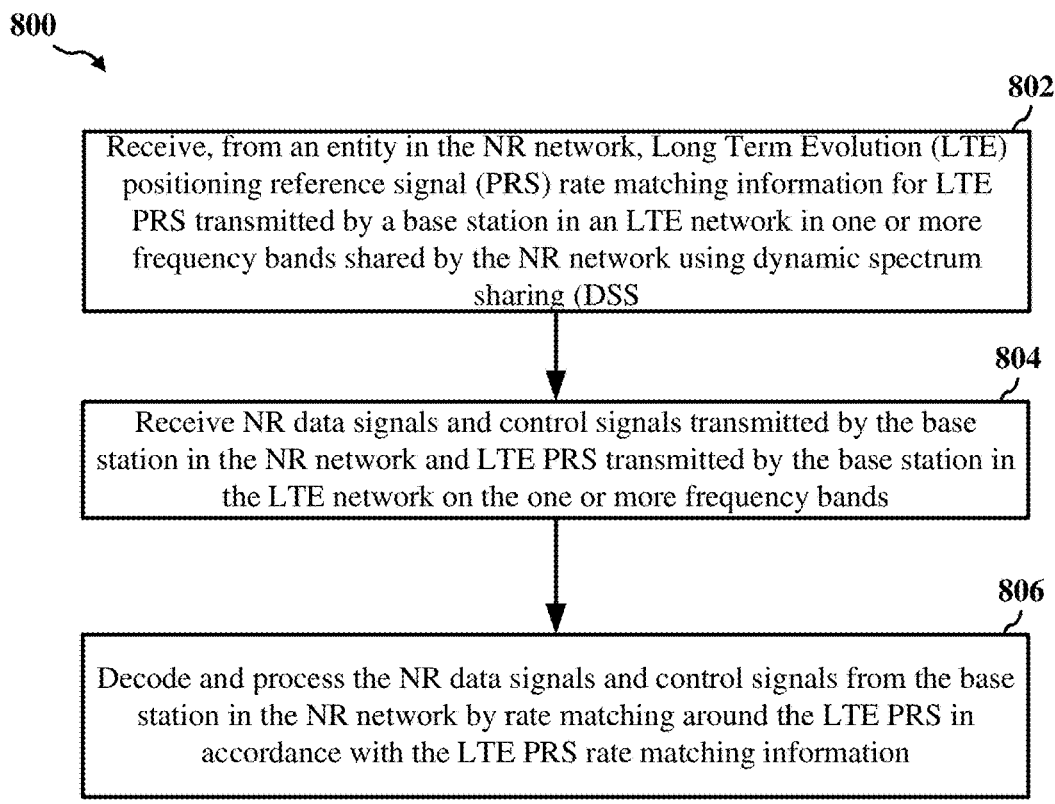
FIG. 8 shows a flowchart of an example procedure for wireless communications performed by UE to receive NR data and control signals while LTE PRS is transmitted on one or more frequency bands shared using DSS.

FIG. 8 shows a flowchart of an example procedure 800 for wireless communications performed by a user equipment (UE), such as UE 104, connected to a New Radio (NR) network, such as 5G NR network 190, e.g., to receive NR data and control signals while LTE PRS is transmitted on one or more frequency bands shared using DSS.

As illustrated, at block 802, the UE receives, from an entity in the NR network, Long Term Evolution (LTE) positioning reference signal (PRS) rate matching information for LTE PRS transmitted by a base station in an LTE network, such as LTE 160, in one or more frequency bands shared by the NR network using dynamic spectrum sharing (DSS), e.g., as discussed at stage 6 of FIG. 7. At block 804, the UE receives NR data signals and control signals transmitted by a base station in the NR network and LTE PRS transmitted by the base station in the LTE network on the one or more frequency bands, e.g., as discussed at stage 7 and 8 of FIG. 7. At block 806, the UE decodes and processes the NR data signals and control signals from the base station in the NR network by rate matching around the LTE PRS in accordance with the LTE PRS rate matching information, e.g., as discussed at stage 9 of FIG. 7.

In one implementation, the NR data signals and control signals transmitted by the base station in the NR network comprise at least one of physical downlink shared channel (PDSCH) transmissions, physical downlink common channel (PDCCH) transmissions, Synchronization Signal Block (SSB) transmissions, or a combination thereof, e.g., as discussed at stage 7 of FIG. 7.

In one implementation, the LTE PRS rate matching information may be an LTE PRS rate matching pattern, e.g., as discussed at stage 6 of FIG. 7. In another implementation, the LTE PRS rate matching information may be LTE PRS configuration data, e.g., as discussed at stage 6 of FIG. 7. For example, the LTE PRS configuration data comprises one or more of carrier frequency, carrier bandwidth, a number of consecutive PRS sub-frames, a PRS periodicity, a PRS configuration index, a muting pattern, or a combination thereof, e.g., as discussed at stage 6 of FIG. 7.

In one implementation, the UE may further transmit an indication to the entity in the NR network of a capability of rate matching around LTE PRS in DSS, prior to receiving the LTE PRS rate matching information, e.g., as discussed at stage 2 of FIG. 7.

In one implementation, the UE may further receive a muting pattern for the LTE PRS in the LTE PRS rate matching information, wherein the muting pattern is at least partly based on a Synchronization Signal Block (SSB) periodicity from the NR network, e.g., as discussed at stage 6 of FIG. 7. The UE may receive SSB transmissions from the base station in the NR network while the LTE PRS transmitted by the base station in the LTE network is muted, e.g., as discussed at stage 9 of FIG. 7. For example, the LTE PRS may be muted for at least two symbols in a physical resource block (PRB) transmitted by the base station in the LTE network to leave at least four consecutive symbols available for SSB transmissions in the PRB transmitted by the base station in the NR network, e.g., as discussed in reference to FIG. 6.

Figure 9:
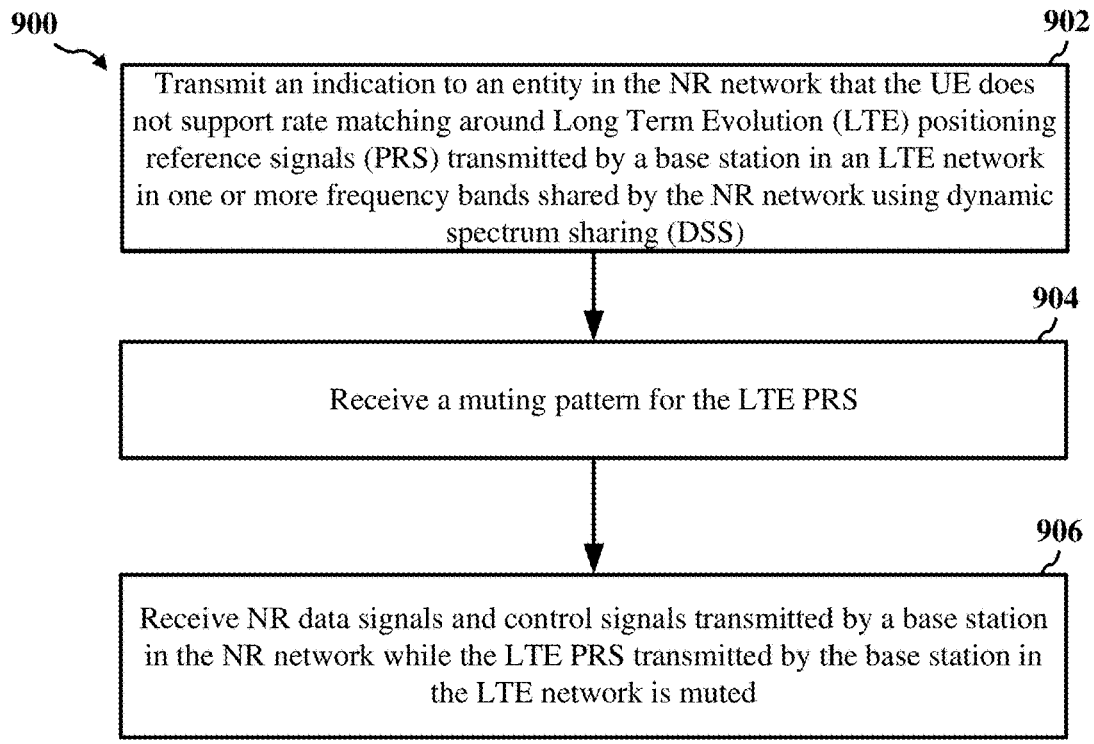
FIG. 9 shows a flowchart of another example procedure for wireless communications performed by UE to receive NR data and control signals while LTE PRS is transmitted on one or more frequency bands shared using DSS

FIG. 9 shows a flowchart of an example procedure 900 for wireless communications performed by a user equipment (UE), such as UE 104, connected to a New Radio (NR) network, such as 5G NR network 190, e.g., to receive NR data and control signals while LTE PRS is transmitted on one or more frequency bands shared using DSS.

As illustrated, at block 902, the UE transmits an indication to an entity in the NR network that the UE does not support rate matching around Long Term Evolution (LTE) positioning reference signals (PRS) transmitted by a base station in an LTE network in one or more frequency bands shared by the NR network using dynamic spectrum sharing (DSS), e.g., as discussed at stage 2 of FIG. 7. At block 904, the UE receives a muting pattern for the LTE PRS, e.g., as discussed at stage 6 of FIG. 7. At block 904, the UE may receive NR data signals and control signals transmitted by a base station in the NR network while the LTE PRS transmitted by the base station in the LTE network is muted, e.g., as discussed at stage 9 of FIG. 7.

In one implementation, the NR data signals and control signals transmitted by the base station in the NR network comprise at least one of physical downlink shared channel (PDSCH) transmissions, physical downlink common channel (PDCCH) transmissions, Synchronization Signal Block (SSB), or a combination thereof, e.g., as discussed at stage 7 of FIG. 7.

In one implementation, the control signals transmitted by the base station in the NR network comprises a Synchronization Signal Block (SSB) and wherein the LTE PRS is muted for at least two symbols in a physical resource block (PRB) transmitted by the base station in the LTE network to leave at least four consecutive symbols available for SSB transmissions in the PRB transmitted by the base station in the NR network, e.g., as discussed in FIG. 6.

Figure 10:
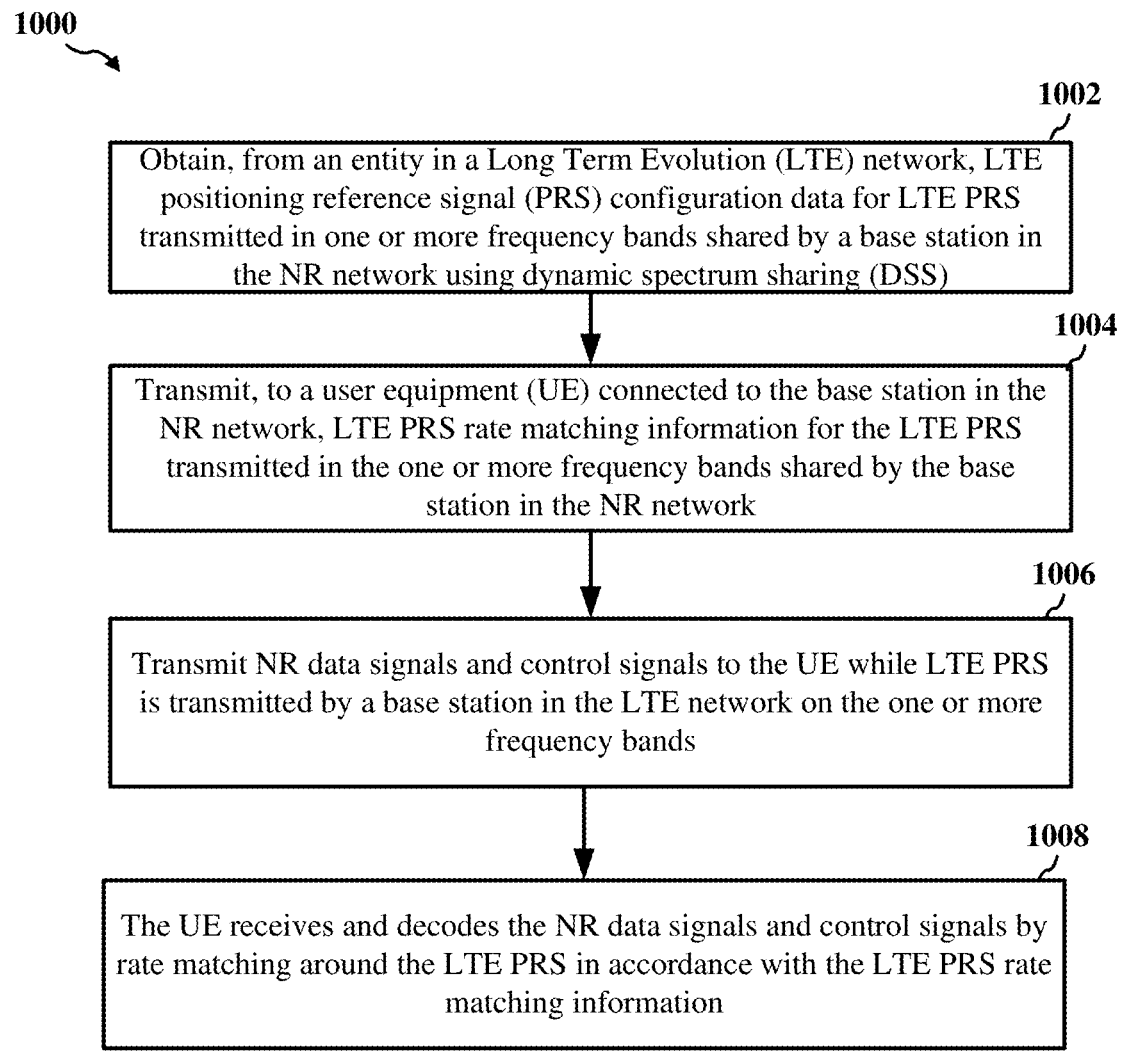
FIG. 10 shows a flowchart of an example procedure for wireless communications performed by base station in an 5G NR network to provide a UE with NR data and control signals while LTE PRS is transmitted on one or more frequency bands shared using DSS.

FIG. 10 shows a flowchart of an example procedure 1000 for wireless communications performed by an entity in a New Radio (NR) network, such as base station 102-1 in the 5G NR network 190, shown in FIGS. 1 and 7, e.g., to provide a UE with NR data and control signals while LTE PRS is transmitted on one or more frequency bands shared using DSS.

As illustrated, at block 1002, the entity obtains, from an entity in a Long Term Evolution (LTE) network, LTE positioning reference signal (PRS) configuration data for LTE PRS transmitted in one or more frequency bands shared by a base station in the NR network using dynamic spectrum sharing (DSS), e.g., as discussed at stages 3 and 5 of FIG. 7. At block 1004, the entity transmits, to a user equipment (UE) connected to the base station in the NR network, LTE PRS rate matching information for the LTE PRS transmitted in the one or more frequency bands shared by the base station in the NR network, e.g., as discussed at stage 6 of FIG. 7. At block 1006, the entity transmits NR data signals and control signals to the UE while LTE PRS is transmitted by a base station in the LTE network on the one or more frequency bands, e.g., as discussed at stage 7 and 8 of FIG. 7. At block 1008, the UE receives and decodes the NR data signals and control signals by rate matching around the LTE PRS in accordance with the LTE PRS rate matching information, e.g., as discussed at stage 9 of FIG. 7.

In one implementation, the NR data signals and control signals transmitted by the base station in the NR network comprise at least one of physical downlink shared channel (PDSCH) transmissions and physical downlink common channel (PDCCH) transmissions or a combination thereof, e.g., as discussed at stage 7 of FIG. 7.

In one implementation, the LTE PRS rate matching information may be an LTE PRS rate matching pattern, e.g., as discussed at stage 6 of FIG. 7. In another implementation, the LTE PRS rate matching information may be LTE PRS configuration data, e.g., as discussed at stage 6 of FIG. 7. For example, the LTE PRS configuration data comprises one or more of carrier frequency, carrier bandwidth, a number of consecutive PRS sub-frames, a PRS periodicity, a PRS configuration index, a muting pattern, or a combination thereof, e.g., as discussed at stage 6 of FIG. 7.

In one implementation, the entity receives an indication from the UE of a capability of rate matching around LTE PRS in DSS, prior to transmitting the LTE PRS rate matching information to the UE, e.g., as discussed at stage 2 of FIG. 7.

In one implementation, the entity may alter a muting pattern for the LTE PRS at least partly based on a Synchronization Signal Block (SSB) periodicity from the NR network, e.g., as discussed at stage 4 of FIG. 7. The altered muting pattern may be transmitted to the UE, e.g., as discussed at stage 6 of FIG. 7. The entity may transmit SSB transmissions to the UE while the LTE PRS transmitted by the base station in the LTE network is muted, e.g., as discussed at stages 7 and 9 of FIG. 7. For example, the LTE PRS is muted for at least two symbols in a physical resource block (PRB) transmitted by the base station in the LTE network to leave at least four consecutive symbols available for SSB transmissions in the PRB transmitted by the base station in the NR network, e.g., as discussed in reference to FIG. 6. In one implementation, the entity may alter the muting pattern for the LTE PRS at least partly based on the SSB periodicity from the NR network by sending the SSB periodicity to the base station in the LTE network, e.g., as discussed at stage 4 of FIG. 7 and receiving the altered muting pattern from the base station in the LTE network, e.g., as discussed at stage 5 of FIG. 7.

Figure 11:
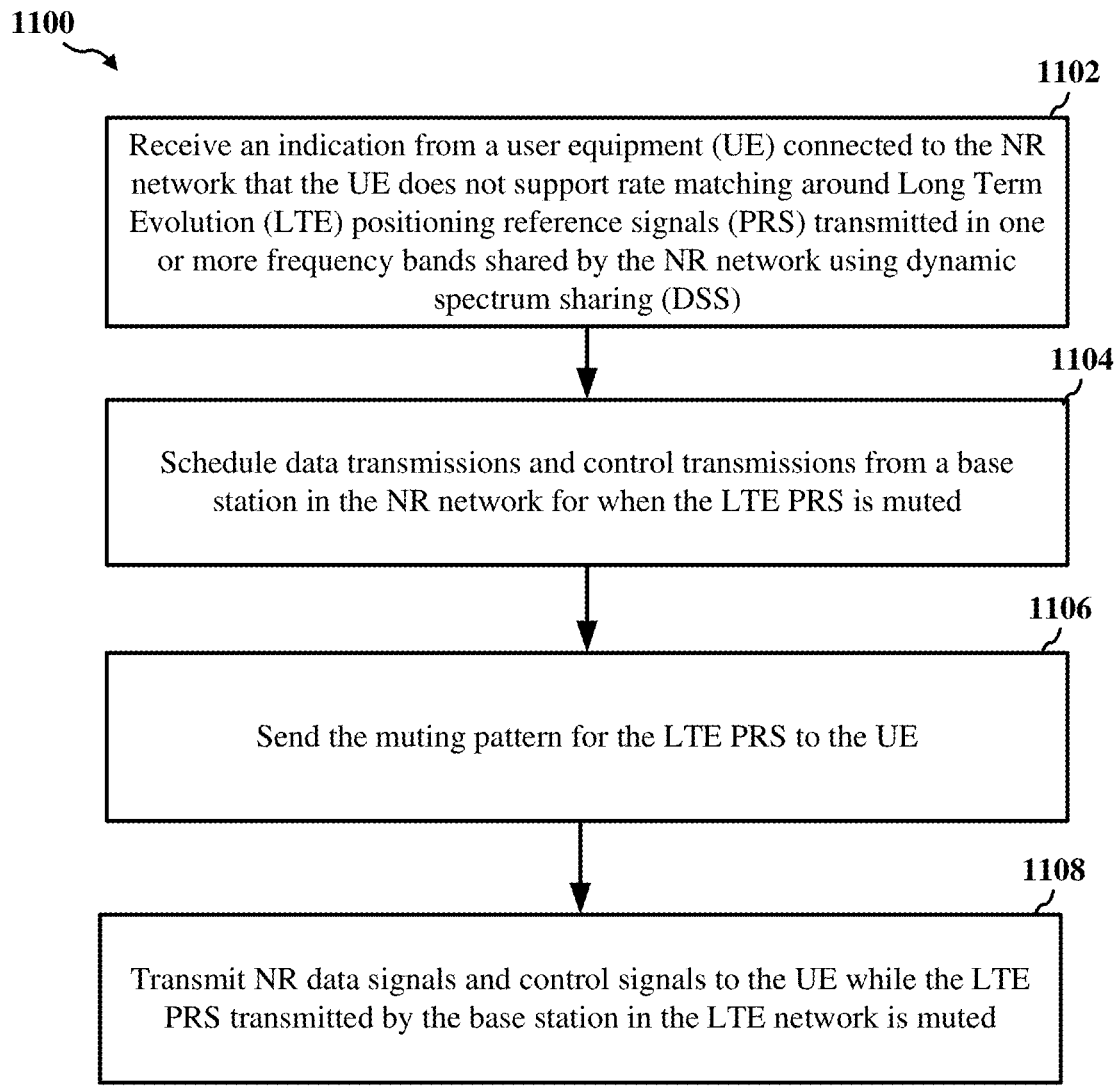
FIG. 11 shows a flowchart of another example procedure for wireless communications performed by base station in an 5G NR network to provide a UE with NR data and control signals while LTE PRS is transmitted on one or more frequency bands shared using DSS.

FIG. 11 shows a flowchart of an example procedure 1100 for wireless communications performed by an entity in a New Radio (NR) network, such as base station 102-1 in the 5G NR network 190, shown in FIGS. 1 and 7.

As illustrated, at block 1102, the entity receives an indication from a user equipment (UE) connected to the NR network that the UE does not support rate matching around Long Term Evolution (LTE) positioning reference signals (PRS) transmitted in one or more frequency bands shared by the NR network using dynamic spectrum sharing (DSS), e.g., as discussed at stage 2 of stage 7. At block 1104, the entity schedules data transmissions and control transmissions from a base station in the NR network for when the LTE PRS is muted, e.g., as discussed at stage 7 of FIG. 7. At block 1106, the muting pattern for the LTE PRS may be sent to the UE, e.g., as discussed at stage 6 of FIG. 7. At block 1108, the entity may transmit NR data signals and control signals to the UE while the LTE PRS transmitted by the base station in the LTE network is muted, e.g., as discussed at stages 7 and 9 of FIG. 7.

In one implementation, the NR data signals and control signals transmitted by the base station in the NR network comprise at least one of physical downlink shared channel (PDSCH) transmissions, physical downlink common channel (PDCCH) transmissions, Synchronization Signal Block (SSB), or a combination thereof, e.g., as discussed at stage 7 of FIG. 7.

In one implementation, the control signals transmitted by the base station in the NR network comprises a Synchronization Signal Block (SSB) and wherein the LTE PRS is muted for at least two symbols in a physical resource block (PRB) transmitted by the base station in the LTE network to leave at least four consecutive symbols available for SSB transmissions in the PRB transmitted by the base station in the NR network, e.g., as discussed in FIG. 6.

Figure 12:
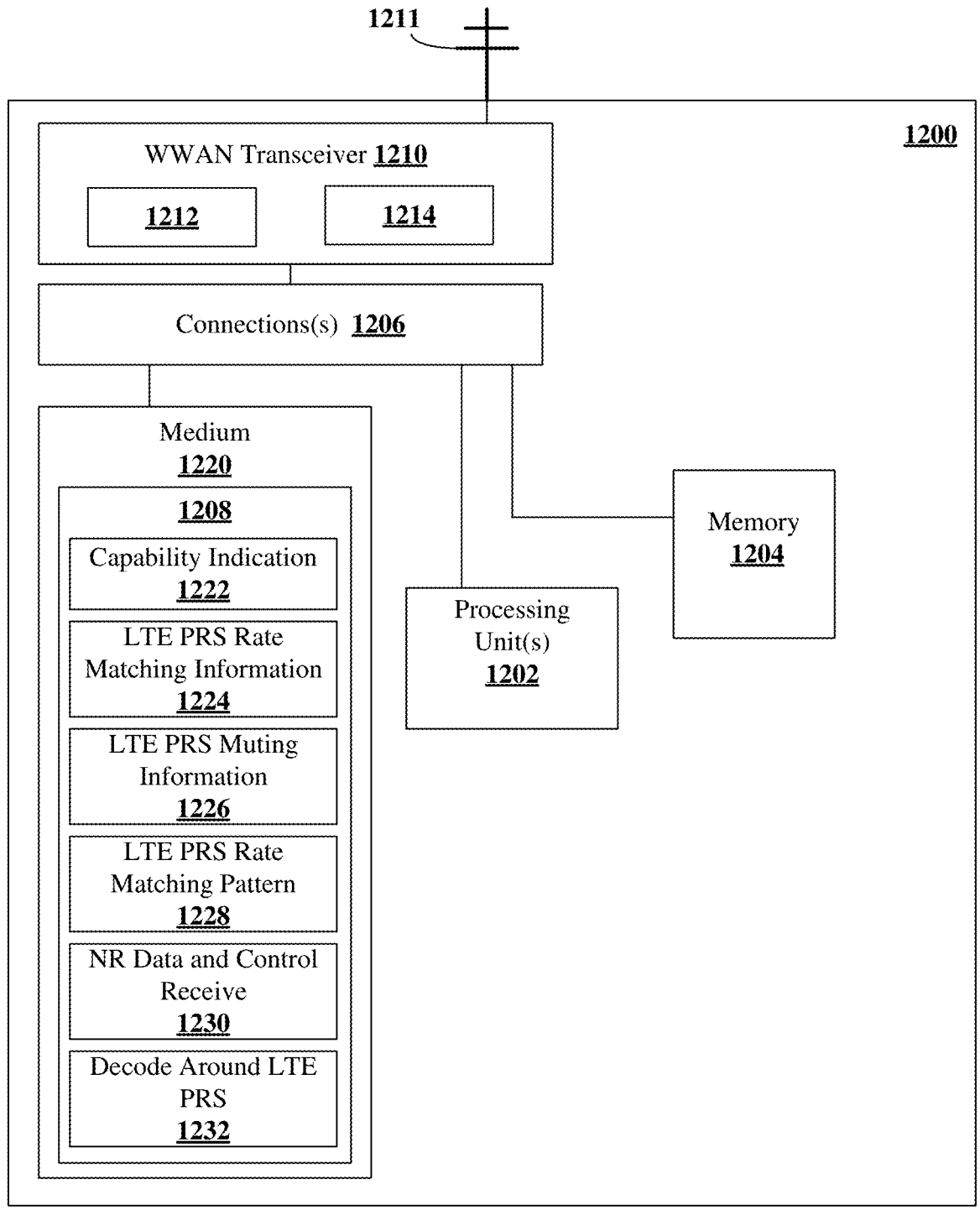
FIG. 12 is a diagram illustrating an example of a hardware implementation of a UE as discussed herein.

FIG. 12 is a diagram illustrating an example of a hardware implementation of a user equipment (UE) 1200, such as UE 104. The UE 1200 may be capable of connecting to a 5G NR wireless network, such as 5G NR network 190, which shares one or more frequency bands with an LTE network, e.g., LTE network 160, using DSS. The UE 1200 may, for example, include one or more processors 1202, memory 1204, an external interface such as a wireless transceiver 1210 (e.g., wireless network interface), which may be operatively coupled with one or more connections 1206 (e.g., buses, lines, fibers, links, etc.) to non-transitory computer readable medium 1220 and memory 1204. The UE 1200 may further include additional items, which are not shown, such as a user interface that may include e.g., a display, a keypad or other input device, such as virtual keypad on the display, through which a user may interface with the UE, or a satellite positioning system receiver. In certain example implementations, all or part of UE 1200 may take the form of a chipset, and/or the like. Wireless transceiver 1210 may, for example, include a transmitter 1212 enabled to transmit one or more signals over one or more types of wireless communication networks and a receiver 1214 to receive one or more signals transmitted over the one or more types of wireless communication networks.

In some embodiments, UE 1200 may include antenna 1211, which may be internal or external. UE antenna 1211 may be used to transmit and/or receive signals processed by wireless transceiver 1210. In some embodiments, UE antenna 1211 may be coupled to wireless transceiver 1210. The wireless transceiver 1210 may be capable of transmitting and receiving both WWAN and WLAN signals, or one or more additional transceivers may be included. In some embodiments, measurements of signals received (transmitted) by UE 1200 may be performed at the point of connection of the UE antenna 1211 and wireless transceiver 1210. For example, the measurement point of reference for received (transmitted) RF signal measurements may be an input (output) terminal of the receiver 1214 (transmitter 1212) and an output (input) terminal of the UE antenna 1211. In a UE 1200 with multiple UE antennas 1211 or antenna arrays, the antenna connector may be viewed as a virtual point representing the aggregate output (input) of multiple UE antennas. In some embodiments, UE 1200 may measure received signals including signal strength and TOA measurements and the raw measurements may be processed by the one or more processors 1202.

The one or more processors 1202 may be implemented using a combination of hardware, firmware, and software. For example, the one or more processors 1202 may be configured to perform the functions discussed herein by implementing one or more instructions or program code 1208 on a non-transitory computer readable medium, such as medium 1220 and/or memory 1204. In some embodiments, the one or more processors 1202 may represent one or more circuits configurable to perform at least a portion of a data signal computing procedure or process related to the operation of UE 1200.

The medium 1220 and/or memory 1204 may store instructions or program code 1208 that contain executable code or software instructions that when executed by the one or more processors 1202 cause the one or more processors 1202 to operate as a special purpose computer programmed to perform the techniques disclosed herein. As illustrated in UE 1200, the medium 1220 and/or memory 1204 may include one or more components or modules that may be implemented by the one or more processors 1202 to perform the methodologies described herein. While the components or modules are illustrated as software in medium 1220 that is executable by the one or more processors 1202, it should be understood that the components or modules may be stored in memory 1204 or may be dedicated hardware either in the one or more processors 1202 or off the processors.

A number of software modules and data tables may reside in the medium 1220 and/or memory 1204 and be utilized by the one or more processors 1202 in order to manage both communications and the functionality described herein. It should be appreciated that the organization of the contents of the medium 1220 and/or memory 1204 as shown in UE 1200 is merely exemplary, and as such the functionality of the modules and/or data structures may be combined, separated, and/or be structured in different ways depending upon the implementation of the UE 1200.

The medium 1220 and/or memory 1204 may include a capability indication module 1222 that when implemented by the one or more processors 1202 configures the one or more processors 1202 to transmit to the entity in the NR network, via wireless transceiver 1210, an indication of whether the UE is capable of rate matching around LTE PRS in DSS. The indication of whether the UE is capable of rate matching around LTE PRS may be in response to a request for indication received from the entity in the NR network.

The medium 1220 and/or memory 1204 may include an LTE PRS rate matching information module 1224 that when implemented by the one or more processors 1202 configures the one or more processors 1202 to receive from an entity in the NR network, via the wireless transceiver 1210, LTE PRS rate matching information for LTE PRS transmitted by a base station in the LTE network in the frequency bands shared using DSS. For example, the LTE PRS rate matching information may be an LTE PRS rate matching pattern. In another example, the LTE PRS rate matching information may be LTE PRS configuration data, such as one or more of carrier frequency, carrier bandwidth, a number of consecutive PRS sub-frames, a PRS periodicity, a PRS configuration index, a muting pattern, or a combination thereof.

The medium 1220 and/or memory 1204 may include an LTE PRS muting information module 1226 that when implemented by the one or more processors 1202 configures the one or more processors 1202 to receive from an entity in the NR network, via the wireless transceiver 1210, LTE PRS muting pattern for the LTE PRS transmitted by a base station in the LTE network in the frequency bands shared using DSS.

The medium 1220 and/or memory 1204 may include an LTE PRS rate matching pattern module 1228 that when implemented by the one or more processors 1202 configures the one or more processors 1202 to determine an LTE PRS rate matching pattern for rate matching around LTE PRS. The LTE PRS rate matching pattern may be obtained based on the LTE PRS rate matching information received from the entity in the 5G NR network. For example, the LTE PRS rate matching pattern may be the LTE PRS rate matching pattern received from the entity in the 5G NR network or may be generated based on received LTE PRS configuration data, including one or more of carrier frequency, carrier bandwidth, a number of consecutive PRS sub-frames, a PRS periodicity, a PRS configuration index, a muting pattern, or a combination thereof.

The medium 1220 and/or memory 1204 may include an NR data and control receive module 1230 that when implemented by the one or more processors 1202 configures the one or more processors 1202 to receive, via wireless transceiver 1210, NR data signals and control signals transmitted by a base station in the NR network while LTE PRS is transmitted by a base station in the LTE network on one or more frequency bands shared by DSS. By way of example, the NR data signals and control signals may include one or more of physical downlink shared channel (PDSCH) transmissions, physical downlink common channel (PDCCH) transmissions, and Synchronization Signal Block (SSB) transmissions.

The medium 1220 and/or memory 1204 may include a decode around LTE PRS module 1232 that when implemented by the one or more processors 1202 configures the one or more processors 1202 to decode and process the received NR data signals and control signals, e.g., by rate matching around the LTE PRS using the LTE PRS rate matching pattern. Additionally, the decode around LTE PRS module 1232 may configure the one or more processors 1202 to decode and process NR data signals and control signals received while LTE PRS is muted based on the received LTE PRS muting pattern.

The methodologies described herein may be implemented by various means depending upon the application. For example, these methodologies may be implemented in hardware, firmware, software, or any combination thereof. For a hardware implementation, the one or more processors 1202 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 1220 or memory 1204 that is connected to and executed by the one or more processors 1202. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 1208 on a non-transitory computer readable medium, such as medium 1220 and/or memory 1204. Examples include computer readable media encoded with a data structure and computer readable media encoded with a computer program 1208. For example, the non-transitory computer readable medium including program code 1208 stored thereon may include program code 1208 to support OTDOA measurements in a manner consistent with disclosed embodiments. Non-transitory computer readable medium 1220 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 1208 in the form of instructions or data structures and that can be accessed by a computer; disk and disc, as used herein, includes compact disc (CD), laser disc, optical disc, digital versatile disc (DVD), floppy disk and blu-ray where disks usually reproduce data magnetically, while discs reproduce data optically with lasers. Combinations of the above should also be included within the scope of computer readable media.

In addition to storage on computer readable medium 1220, instructions and/or data may be provided as signals on transmission media included in a communication apparatus. For example, a communication apparatus may include a wireless transceiver 1210 having signals indicative of instructions and data. The instructions and data are configured to cause one or more processors to implement the functions outlined in the claims. That is, the communication apparatus includes transmission media with signals indicative of information to perform disclosed functions.

Memory 1204 may represent any data storage mechanism. Memory 1204 may include, for example, a primary memory and/or a secondary memory. Primary memory may include, for example, a random-access memory, read only memory, etc. While illustrated in this example as being separate from one or more processors 1202, it should be understood that all or part of a primary memory may be provided within or otherwise co-located/coupled with the one or more processors 1202. Secondary memory may include, for example, the same or similar type of memory as primary memory and/or one or more data storage devices or systems, such as, for example, a disk drive, an optical disc drive, a tape drive, a solid-state memory drive, etc.

In certain implementations, secondary memory may be operatively receptive of, or otherwise configurable to couple to a non-transitory computer readable medium 1220. As such, in certain example implementations, the methods and/or apparatuses presented herein may take the form in whole or part of a computer readable medium 1220 that may include computer implementable code 1208 stored thereon, which if executed by one or more processors 1202 may be operatively enabled to perform all or portions of the example operations as described herein. Computer readable medium 1220 may be a part of memory 1204.

A UE, such as UE 1200, configured for wireless communications with a New Radio (NR) network, may include a means for receiving, from an entity in the NR network, Long Term Evolution (LTE) positioning reference signal (PRS) rate matching information for LTE PRS transmitted by a base station in an LTE network in one or more frequency bands shared by the NR network using dynamic spectrum sharing (DSS), which may be, e.g., the wireless transceiver 1210, one or more processors 1202 with dedicated hardware or implementing executable code or software instructions in memory 1204 and/or medium 1220 such as the LTE PRS rate matching information module 1224. A means for receiving NR data signals and control signals transmitted by the base station in the NR network and LTE PRS transmitted by the base station in the LTE network on the one or more frequency bands may be, e.g., the wireless transceiver 1210, one or more processors 1202 with dedicated hardware or implementing executable code or software instructions in memory 1204 and/or medium 1220 such as the LTE PRS rate matching pattern module 1228, and the NR data and control receive module 1230. A means for decoding and processing the NR data signals and control signals from the base station in the NR network by rate matching around the LTE PRS in accordance with the LTE PRS rate matching information may be, e.g., the one or more processors 1202 with dedicated hardware or implementing executable code or software instructions in memory 1204 and/or medium 1220 such as the decode around LTE PRS module 1232.

In one implementation, the UE may further include a means for transmitting an indication to the entity in the NR network of a capability of rate matching around the LTE PRS in DSS, prior to receiving the LTE PRS rate matching information, which may be, e.g., the wireless transceiver 1210, one or more processors 1202 with dedicated hardware or implementing executable code or software instructions in memory 1204 and/or medium 1220 such as the capability indication module 1222.

In one implementation, the UE may further include a means for receiving a muting pattern for the LTE PRS in the LTE PRS rate matching information, wherein the muting pattern is at least partly based on a Synchronization Signal Block (SSB) periodicity from the NR network, which may be, e.g., the wireless transceiver 1210, one or more processors 1202 with dedicated hardware or implementing executable code or software instructions in memory 1204 and/or medium 1220 such as the LTE PRS muting information module 1226. A means for receiving SSB transmissions from the base station in the NR network while the LTE PRS transmitted by the base station in the LTE network is muted may be, e.g., the wireless transceiver 1210, one or more processors 1202 with dedicated hardware or implementing executable code or software instructions in memory 1204 and/or medium 1220 such as the NR data and control receive module 1230.

A UE, such as UE 1200, configured for wireless communications with a New Radio (NR) network, may include a means for transmitting an indication to an entity in the NR network that the UE does not support rate matching around Long Term Evolution (LTE) positioning reference signals (PRS) transmitted by a base station in an LTE network in one or more frequency bands shared by the NR network using dynamic spectrum sharing (DSS), which may be, e.g., the wireless transceiver 1210, one or more processors 1202 with dedicated hardware or implementing executable code or software instructions in memory 1204 and/or medium 1220 such as the capability indication module 1222. A means for receiving a muting pattern for the LTE PRS may be, e.g., the wireless transceiver 1210, one or more processors 1202 with dedicated hardware or implementing executable code or software instructions in memory 1204 and/or medium 1220 such as the LTE PRS muting information module 1226. A means for receiving NR data signals and control signals transmitted by a base station in the NR network while the LTE PRS transmitted by the base station in the LTE network is muted may be, e.g., the wireless transceiver 1210, one or more processors 1202 with dedicated hardware or implementing executable code or software instructions in memory 1204 and/or medium 1220 such as the NR data and control receive module 1230.

Figure 13:
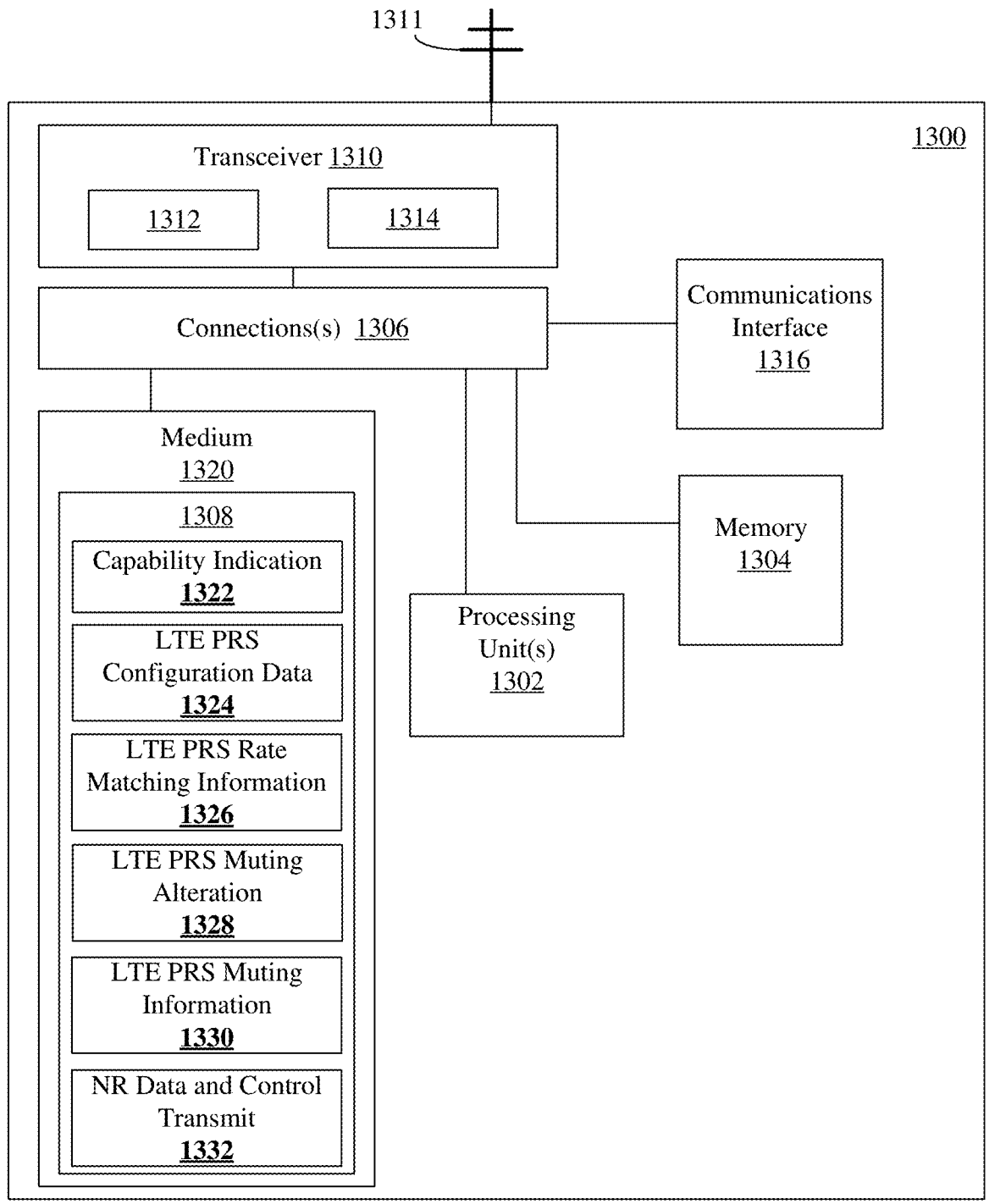
FIG. 13 is a diagram illustrating an example of a hardware implementation of a base station as discussed herein.

FIG. 13 shows a schematic block diagram illustrating certain exemplary features of a base station 1300 in an 5G NR network, e.g., base station 102 in 5G NR network 190. Base station 1300 may, for example, include one or more processors 1302, memory 1304, an external interface, which may include a wireless transceiver 1310 and a communications interface 1316 (e.g., wireline or wireless network interface to other base stations and/or the core network), which may be operatively coupled with one or more connections 1306 (e.g., buses, lines, fibers, links, etc.) to non-transitory computer readable medium 1320 and memory 1304. The base station 1300 may further include additional items, which are not shown. In certain example implementations, all or part of base station 1300 may take the form of a chipset, and/or the like. Wireless transceiver 1310 may, for example, include a transmitter 1312 enabled to transmit one or more signals over one or more types of wireless communication networks and a receiver 1314 to receive one or more signals transmitted over the one or more types of wireless communication networks. The communications interface 1316 may be a wired or wireless interface capable of connecting to other base stations or network entities in the same 5G NR network or in an LTE network that shares one or more frequency bands with the base station 1300 using DSS In some embodiments, base station 1300 may include antenna 1311, which may be internal or external. Antenna 1311 may be used to transmit and/or receive signals processed by wireless transceiver 1310. In some embodiments, antenna 1311 may be coupled to wireless transceiver 1310. In some embodiments, measurements of signals received (transmitted) by base station 1300 may be performed at the point of connection of the antenna 1311 and wireless transceiver 1310. For example, the measurement point of reference for received (transmitted) RF signal measurements may be an input (output) terminal of the receiver 1314 (transmitter 1312) and an output (input) terminal of the antenna 1311. In a base station 1300 with multiple antennas 1311 or antenna arrays, the antenna connector may be viewed as a virtual point representing the aggregate output (input) of multiple antennas. In some embodiments, base station 1300 may measure received signals including signal strength and TOA measurements and the raw measurements may be processed by the one or more processors 1302.

The one or more processors 1302 may be implemented using a combination of hardware, firmware, and software. For example, the one or more processors 1302 may be configured to perform the functions discussed herein by implementing one or more instructions or program code 1308 on a non-transitory computer readable medium, such as medium 1320 and/or memory 1304. In some embodiments, the one or more processors 1302 may represent one or more circuits configurable to perform at least a portion of a data signal computing procedure or process related to the operation of base station 1300.

The medium 1320 and/or memory 1304 may store instructions or program code 1308 that contain executable code or software instructions that when executed by the one or more processors 1302 cause the one or more processors 1302 to operate as a special purpose computer programmed to perform the techniques disclosed herein. As illustrated in base station 1300, the medium 1320 and/or memory 1304 may include one or more components or modules that may be implemented by the one or more processors 1302 to perform the methodologies described herein. While the components or modules are illustrated as software in medium 1320 that is executable by the one or more processors 1302, it should be understood that the components or modules may be stored in memory 1304 or may be dedicated hardware either in the one or more processors 1302 or off the processors.

A number of software modules and data tables may reside in the medium 1320 and/or memory 1304 and be utilized by the one or more processors 1302 in order to manage both communications and the functionality described herein. It should be appreciated that the organization of the contents of the medium 1320 and/or memory 1304 as shown in base station 1300 is merely exemplary, and as such the functionality of the modules and/or data structures may be combined, separated, and/or be structured in different ways depending upon the implementation of the base station 1300.

The medium 1320 and/or memory 1304 may include a capability indication module 1322 that when implemented by the one or more processors 1302 configures the one or more processors 1302 to receive from a UE, via wireless transceiver 1310, an indication of whether the UE is capable of rate matching around LTE PRS in DSS. The indication of whether the UE is capable of rate matching around LTE PRS may be in response to a request for indication transmitted to the UE via the base station 1300.

The medium 1320 and/or memory 1304 may include an LTE PRS configuration data module 1324 that when implemented by the one or more processors 1302 configures the one or more processors 1302 to receive LTE PRS configuration data from an LTE network, via the communications interface 1316, via an Xn message. The LTE PRS configuration data, may include, e.g., one or more of carrier frequency, carrier bandwidth, a number of consecutive PRS sub-frames, a PRS periodicity, a PRS configuration index, a muting pattern, or a combination thereof.

The medium 1320 and/or memory 1304 may include an LTE PRS rate matching information module 1326 that when implemented by the one or more processors 1302 configures the one or more processors 1302 to determine LTE PRS rate matching information and to send the LTE PRS rate matching information to a UE, via the wireless transceiver 1310. For example, the LTE PRS rate matching pattern may be generated based on the received LTE PRS configuration data, including one or more of carrier frequency, carrier bandwidth, a number of consecutive PRS sub-frames, a PRS periodicity, a PRS configuration index, a muting pattern, or a combination thereof. In some implementations, the LTE PRS rate matching pattern may be generated by another entity in the 5G NR network based on the LTE PRS configuration data and provided to the base station 1300, via communications interface 1316.

The medium 1320 and/or memory 1304 may include an LTE PRS muting alteration module 1328 that when implemented by the one or more processors 1302 configures the one or more processors 1302 to alter the muting pattern of the LTE PRS. For example, the muting pattern of the LTE PRS may be altered based on the SSB periodicity. The muting pattern of the LTE PRS may be altered by requesting that a base station in the LTE network alter the muting pattern and may include sending the SSB periodicity to the base station in the LTE network and receiving the altered muting pattern from the base station in the LTE network.

The medium 1320 and/or memory 1304 may include an LTE PRS muting information module 1330 that when implemented by the one or more processors 1302 configures the one or more processors 1302 to provide the altered muting pattern to the UE, via the wireless transceiver 1310. In some implementations, the muting pattern of the LTE PRS may be provided to the UE in the LTE PRS rate matching information or separately from the LTE PRS rate matching information, e.g., if the UE does not have the capability of LTE PRS rate matching.

The medium 1320 and/or memory 1304 may include an NR data and control transmit module 1332 that when implemented by the one or more processors 1302 configures the one or more processors 1302 to schedule and transmit, via wireless transceiver 1310, NR data signals and control signals to the UE while LTE PRS is transmitted by a base station in the LTE network on one or more frequency bands shared by DSS. By way of example, the NR data signals and control signals may include one or more of physical downlink shared channel (PDSCH) transmissions, physical downlink common channel (PDCCH) transmissions, and Synchronization Signal Block (SSB) transmissions. The NR data signals and control signals may be transmitted to the UE while the LTE PRS transmitted by the base station in the LTE network is muted.

The methodologies described herein may be implemented by various means depending upon the application. For example, these methodologies may be implemented in hardware, firmware, software, or any combination thereof. For a hardware implementation, the one or more processors 1302 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 1320 or memory 1304 that is connected to and executed by the one or more processors 1302. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 1308 on a non-transitory computer readable medium, such as medium 1320 and/or memory 1304. Examples include computer readable media encoded with a data structure and computer readable media encoded with a computer program 1308. For example, the non-transitory computer readable medium including program code 1308 stored thereon may include program code 1308 to support OTDOA measurements in a manner consistent with disclosed embodiments. Non-transitory computer readable medium 1320 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 1308 in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media.

In addition to storage on computer readable medium 1320, instructions and/or data may be provided as signals on transmission media included in a communication apparatus. For example, a communication apparatus may include a wireless transceiver 1310 having signals indicative of instructions and data. The instructions and data are configured to cause one or more processors to implement the functions outlined in the claims. That is, the communication apparatus includes transmission media with signals indicative of information to perform disclosed functions.

Memory 1304 may represent any data storage mechanism. Memory 1304 may include, for example, a primary memory and/or a secondary memory. Primary memory may include, for example, a random-access memory, read only memory, etc. While illustrated in this example as being separate from one or more processors 1302, it should be understood that all or part of a primary memory may be provided within or otherwise co-located/coupled with the one or more processors 1302. Secondary memory may include, for example, the same or similar type of memory as primary memory and/or one or more data storage devices or systems, such as, for example, a disk drive, an optical disc drive, a tape drive, a solid-state memory drive, etc.

In certain implementations, secondary memory may be operatively receptive of, or otherwise configurable to couple to a non-transitory computer readable medium 1320. As such, in certain example implementations, the methods and/or apparatuses presented herein may take the form in whole or part of a computer readable medium 1320 that may include computer implementable code 1308 stored thereon, which if executed by one or more processors 1302 may be operatively enabled to perform all or portions of the example operations as described herein. Computer readable medium 1320 may be a part of memory 1304.

An entity in a New Radio (NR) network, such as base station 1300, connected to an entity in a Long Term Evolution (LTE) Network and a user equipment (UE), may include a means for obtaining, from the entity in the LTE network, LTE positioning reference signal (PRS) configuration data for LTE PRS transmitted in one or more frequency bands shared by a base station in the NR network using dynamic spectrum sharing (DSS), which may be, e.g., an external interface, e.g., including wireless transceiver 1310 and a communications interface 1316, one or more processors 1302 with dedicated hardware or implementing executable code or software instructions in memory 1304 and/or medium 1320 such as the LTE PRS configuration data module 1324. A means for transmitting, to the UE connected to the base station in the NR network, LTE PRS rate matching information for the LTE PRS transmitted in the one or more frequency bands shared by the base station in the NR network may be, e.g., the external interface, e.g., including wireless transceiver 1310, one or more processors 1302 with dedicated hardware or implementing executable code or software instructions in memory 1304 and/or medium 1320 such as the LTE PRS rate matching information module 1326. A means for transmitting NR data signals and control signals to the UE while the LTE PRS is transmitted by a base station in the LTE network on the one or more frequency bands may be, e.g., the external interface, e.g., including wireless transceiver 1310, one or more processors 1302 with dedicated hardware or implementing executable code or software instructions in memory 1304 and/or medium 1320 such as the NR data and control transmit module 1332. The UE receives and decodes the NR data signals and control signals by rate matching around the LTE PRS in accordance with the LTE PRS rate matching information.

In one implementations, the entity may further include a means for receiving an indication from the UE of a capability of rate matching around the LTE PRS in DSS, prior to transmitting the LTE PRS rate matching information to the UE, which may be, e.g., the external interface, e.g., including wireless transceiver 1310, one or more processors 1302 with dedicated hardware or implementing executable code or software instructions in memory 1304 and/or medium 1320 such as the capability indication module 1322.

In one implementations, the entity may further include means for altering a muting pattern for the LTE PRS at least partly based on a Synchronization Signal Block (SSB) periodicity from the NR network; may be, e.g., the external interface, e.g., including wireless transceiver 1310 and the communications interface 1316, one or more processors 1302 with dedicated hardware or implementing executable code or software instructions in memory 1304 and/or medium 1320 such as the LTE PRS muting alteration module 1328. A means for transmitting the altered muting pattern to the UE may be, e.g., the external interface, e.g., including wireless transceiver 1310, one or more processors 1302 with dedicated hardware or implementing executable code or software instructions in memory 1304 and/or medium 1320 such as the LTE PRS muting information module 1330. A means for transmitting SSB transmissions to the UE while the LTE PRS transmitted by the base station in the LTE network is muted may be, e.g., the external interface, e.g., including wireless transceiver 1310, one or more processors 1302 with dedicated hardware or implementing executable code or software instructions in memory 1304 and/or medium 1320 such as the NR data and control transmit module 1332. In one implementation, the means for altering the muting pattern for the LTE PRS at least partly based on the SSB periodicity from the NR network may include a means for sending the SSB periodicity to the base station in the LTE network, which may be, e.g., the external interface, e.g., including wireless transceiver 1310 and the communications interface 1316, one or more processors 1302 with dedicated hardware or implementing executable code or software instructions in memory 1304 and/or medium 1320 such as the LTE PRS muting alteration module 1328. A means for receiving the altered muting pattern from the base station in the LTE network may be, e.g., the external interface, e.g., including wireless transceiver 1310 and the communications interface 1316, one or more processors 1302 with dedicated hardware or implementing executable code or software instructions in memory 1304 and/or medium 1320 such as the LTE PRS muting alteration module 1328.

An entity in a New Radio (NR) network, such as base station 1300, connected to an entity in a Long Term Evolution (LTE) Network and a user equipment (UE), may include a means for receiving an indication from the UE connected to the NR network that the UE does not support rate matching around LTE positioning reference signals (PRS) transmitted in one or more frequency bands shared by the NR network using dynamic spectrum sharing (DSS), which may be, e.g., an external interface, e.g., including wireless transceiver 1310, one or more processors 1302 with dedicated hardware or implementing executable code or software instructions in memory 1304 and/or medium 1320 such as the capability indication module 1322. A means for scheduling data transmissions and control transmissions from a base station in the NR network for when the LTE PRS is muted; may be, e.g., the external interface, e.g., including wireless transceiver 1310 and a communications interface 1316, one or more processors 1302 with dedicated hardware or implementing executable code or software instructions in memory 1304 and/or medium 1320 such as the LTE PRS muting alteration module 1328. A means for sending a muting pattern for the LTE PRS to the UE; may be, e.g., the external interface, e.g., including wireless transceiver 1310, one or more processors 1302 with dedicated hardware or implementing executable code or software instructions in memory 1304 and/or medium 1320 such as the LTE PRS muting information module 1330. A means for transmitting NR data signals and control signals to the UE while the LTE PRS transmitted by the base station in the LTE network is muted may be, e.g., the external interface, e.g., including wireless transceiver 1310, one or more processors 1302 with dedicated hardware or implementing executable code or software instructions in memory 1304 and/or medium 1320 such as the NR data and control transmit module 1332.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures, or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Implementation examples are described in the following numbered clauses:

1. A method for wireless communications performed by a user equipment (UE) connected to a New Radio (NR) network, the method comprising:
  receiving, from an entity in the NR network, Long Term Evolution (LTE) positioning reference signal (PRS) rate matching information for LTE PRS transmitted by a base station in an LTE network in one or more frequency bands shared by the NR network using dynamic spectrum sharing (DSS);
  receiving NR data signals and control signals transmitted by the base station in the NR network and the LTE PRS transmitted by the base station in the LTE network on the one or more frequency bands; and
  decoding and processing the NR data signals and control signals from the base station in the NR network by rate matching around the LTE PRS in accordance with the LTE PRS rate matching information.
2. The method of clause 1, wherein the NR data signals and control signals transmitted by the base station in the NR network comprise at least one of physical downlink shared channel (PDSCH) transmissions, physical downlink common channel (PDCCH) transmissions, Synchronization Signal Block (SSB) transmissions, or a combination thereof.
3. The method of either of clauses 1 or 2, wherein the LTE PRS rate matching information comprises an LTE PRS rate matching pattern.
4. The method of any of clauses 1-3, wherein the LTE PRS rate matching information comprises LTE PRS configuration data.
5. The method of clause 4, wherein the LTE PRS configuration data comprises one or more of carrier frequency, carrier bandwidth, a number of consecutive PRS sub-frames, a PRS periodicity, a PRS configuration index, a muting pattern, or a combination thereof.
6. The method of any of clauses 1-5, further comprising:
  transmitting an indication to the entity in the NR network of a capability of rate matching around the LTE PRS in DSS, prior to receiving the LTE PRS rate matching information.
7. The method of any of clauses 1-6, further comprising:
  receiving a muting pattern for the LTE PRS in the LTE PRS rate matching information, wherein the muting pattern is at least partly based on a Synchronization Signal Block (SSB) periodicity from the NR network; and
  receiving SSB transmissions from the base station in the NR network while the LTE PRS transmitted by the base station in the LTE network is muted.
8. The method of clause 7, wherein the LTE PRS is muted for at least two symbols in a physical resource block (PRB) transmitted by the base station in the LTE network to leave at least four consecutive symbols available for SSB transmissions in the PRB transmitted by the base station in the NR network.
9. A user equipment (UE) configured for wireless communications with a New Radio (NR) network, the UE comprising:
  a wireless transceiver configured to wirelessly communicate with network entities in a wireless communication system;
  at least one memory;
  at least one processor coupled to the wireless transceiver and the at least one memory, wherein the at least one processor is configured to:

receive, from an entity in the NR network via the wireless transceiver, Long Term Evolution (LTE) positioning reference signal (PRS) rate matching information for LTE PRS transmitted by a base station in an LTE network in one or more frequency bands shared by the NR network using dynamic spectrum sharing (DSS);

receive, via the wireless transceiver, NR data signals and control signals transmitted by the base station in the NR network and the LTE PRS transmitted by the base station in the LTE network on the one or more frequency bands; and decode and process the NR data signals and control signals from the base station in the NR network by rate matching around the LTE PRS in accordance with the LTE PRS rate matching information.

10. The UE of clause 9, wherein the NR data signals and control signals transmitted by the base station in the NR network comprise at least one of physical downlink shared channel (PDSCH) transmissions, physical downlink common channel (PDCCH) transmissions, Synchronization Signal Block (SSB) transmissions, or a combination thereof.

11. The UE of either of clauses 9 or 10, wherein the LTE PRS rate matching information comprises an LTE PRS rate matching pattern.

12. The UE of any of clauses 9-11, wherein the LTE PRS rate matching information comprises LTE PRS configuration data.

13. The UE of clause 12, wherein the LTE PRS configuration data comprises one or more of carrier frequency, carrier bandwidth, a number of consecutive PRS subframes, a PRS periodicity, a PRS configuration index, a muting pattern, or a combination thereof.

14. The UE of any of clauses 9-13, wherein the at least one processor is further configured to:
transmit, via the wireless transceiver, an indication to the entity in the NR network of a capability of rate matching around the LTE PRS in DSS, prior to receiving the LTE PRS rate matching information.

15. The UE of any of clauses 9-14, wherein the at least one processor is further configured to:
receive via the wireless transceiver, a muting pattern for the LTE PRS in the LTE PRS rate matching information, wherein the muting pattern is at least partly based on a Synchronization Signal Block (SSB) periodicity from the NR network; and
receive, via the wireless transceiver, SSB transmissions from the base station in the NR network while the LTE PRS transmitted by the base station in the LTE network is muted.

16. The UE of clause 15, wherein the LTE PRS is muted for at least two symbols in a physical resource block (PRB) transmitted by the base station in the LTE network to leave at least four consecutive symbols available for SSB transmissions in the PRB transmitted by the base station in the NR network.

17. A user equipment (UE) configured for wireless communications with a New Radio (NR) network, the UE comprising:
means for receiving, from an entity in the NR network, Long Term Evolution (LTE) positioning reference signal (PRS) rate matching information for LTE PRS transmitted by a base station in an LTE network in one or more frequency bands shared by the NR network using dynamic spectrum sharing (DSS);
means for receiving NR data signals and control signals transmitted by the base station in the NR network and the LTE PRS transmitted by the base station in the LTE network on the one or more frequency bands; and
means for decoding and processing the NR data signals and control signals from the base station in the NR network by rate matching around the LTE PRS in accordance with the LTE PRS rate matching information.

18. The UE of clause 17, wherein the NR data signals and control signals transmitted by the base station in the NR network comprise at least one of physical downlink shared channel (PDSCH) transmissions, physical downlink common channel (PDCCH) transmissions, Synchronization Signal Block (SSB) transmissions, or a combination thereof.

19. The UE of either of clauses 17 or 18, wherein the LTE PRS rate matching information comprises an LTE PRS rate matching pattern.

20. The UE of any of clauses 17-19, wherein the LTE PRS rate matching information comprises LTE PRS configuration data.

21. The UE of clause 20, wherein the LTE PRS configuration data comprises one or more of carrier frequency, carrier bandwidth, a number of consecutive PRS subframes, a PRS periodicity, a PRS configuration index, a muting pattern, or a combination thereof.

22. The UE of any of clauses 17-21, further comprising:
means for transmitting an indication to the entity in the NR network of a capability of rate matching around the LTE PRS in DSS, prior to receiving the LTE PRS rate matching information.

23. The UE of any of clauses 17-22, further comprising:
means for receiving a muting pattern for the LTE PRS in the LTE PRS rate matching information, wherein the muting pattern is at least partly based on a Synchronization Signal Block (SSB) periodicity from the NR network; and
means for receiving SSB transmissions from the base station in the NR network while the LTE PRS transmitted by the base station in the LTE network is muted.

24. The UE of clause 23, wherein the LTE PRS is muted for at least two symbols in a physical resource block (PRB) transmitted by the base station in the LTE network to leave at least four consecutive symbols available for SSB transmissions in the PRB transmitted by the base station in the NR network.

25. A non-transitory storage medium including program code stored thereon, the program code is operable to configure at least one processor in a user equipment (UE) for wireless communications with a New Radio (NR) network, the UE comprising:
program code to receive, from an entity in the NR network, Long Term Evolution (LTE) positioning reference signal (PRS) rate matching information for LTE PRS transmitted by a base station in an LTE network in one or more frequency bands shared by the NR network using dynamic spectrum sharing (DSS);
program code to receive NR data signals and control signals transmitted by the base station in the NR network and the LTE PRS transmitted by the base station in the LTE network on the one or more frequency bands; and
program code to decode and process the NR data signals and control signals from the base station in the NR network by rate matching around the LTE PRS in accordance with the LTE PRS rate matching information.

26. The non-transitory storage medium of clause 25, wherein the NR data signals and control signals transmitted by the base station in the NR network comprise at least one of physical downlink shared channel (PDSCH) transmissions, physical downlink common channel (PDCCH) transmissions, Synchronization Signal Block (SSB) transmissions, or a combination thereof.

27. The non-transitory storage medium of either of clauses 25 or 26, wherein the LTE PRS rate matching information comprises an LTE PRS rate matching pattern.

28. The non-transitory storage medium of any of clauses 25-27, wherein the LTE PRS rate matching information comprises LTE PRS configuration data.

29. The non-transitory storage medium of any of clauses 25-28, further comprising:
transmitting an indication to the entity in the NR network of a capability of rate matching around the LTE PRS in DSS, prior to receiving the LTE PRS rate matching information.

30. The non-transitory storage medium of any of clauses 25-29, further comprising:
receiving a muting pattern for the LTE PRS in the LTE PRS rate matching information, wherein the muting pattern is at least partly based on a Synchronization Signal Block (SSB) periodicity from the NR network; and
receiving SSB transmissions from the base station in the NR network while the LTE PRS transmitted by the base station in the LTE network is muted.

31. A method for wireless communications performed by a user equipment (UE) connected to a New Radio (NR) network, comprising:
transmitting an indication to an entity in the NR network that the UE does not support rate matching around Long Term Evolution (LTE) positioning reference signals (PRS) transmitted by a base station in an LTE network in one or more frequency bands shared by the NR network using dynamic spectrum sharing (DSS);
receiving a muting pattern for the LTE PRS; and
receiving NR data signals and control signals transmitted by a base station in the NR network while the LTE PRS transmitted by the base station in the LTE network is muted.

32. The method of clause 31, wherein the NR data signals and control signals transmitted by the base station in the NR network comprise at least one of physical downlink shared channel (PDSCH) transmissions, physical downlink common channel (PDCCH) transmissions, Synchronization Signal Block (SSB), or a combination thereof.

33. The method of either of clauses 31 or 32, wherein the control signals transmitted by the base station in the NR network comprises a Synchronization Signal Block (SSB) and wherein the LTE PRS is muted for at least two symbols in a physical resource block (PRB) transmitted by the base station in the LTE network to leave at least four consecutive symbols available for SSB transmissions in the PRB transmitted by the base station in the NR network.

34. A user equipment (UE) configured for wireless communications with a New Radio (NR) network, the UE comprising:
a wireless transceiver configured to wirelessly communicate with network entities in a wireless communication system;
at least one memory;
at least one processor coupled to the wireless transceiver and the at least one memory, wherein the at least one processor is configured to:
transmit, via the wireless transceiver, an indication to an entity in the NR network that the UE does not support rate matching around Long Term Evolution (LTE) positioning reference signals (PRS) transmitted by a base station in an LTE network in one or more frequency bands shared by the NR network using dynamic spectrum sharing (DSS);
receive, via the wireless transceiver, a muting pattern for the LTE PRS; and
receive, via the wireless transceiver, NR data signals and control signals transmitted by a base station in the NR network while the LTE PRS transmitted by the base station in the LTE network is muted.

35. The UE of clause 34, wherein the NR data signals and control signals transmitted by the base station in the NR network comprise at least one of physical downlink shared channel (PDSCH) transmissions, physical downlink common channel (PDCCH) transmissions, Synchronization Signal Block (SSB), or a combination thereof.

36. The UE of either of clauses 34 or 35, wherein the control signals transmitted by the base station in the NR network comprises a Synchronization Signal Block (SSB) and wherein the LTE PRS is muted for at least two symbols in a physical resource block (PRB) transmitted by the base station in the LTE network to leave at least four consecutive symbols available for SSB transmissions in the PRB transmitted by the base station in the NR network.

37. A user equipment (UE) configured for wireless communications with a New Radio (NR) network, the UE comprising:
means for transmitting an indication to an entity in the NR network that the UE does not support rate matching around Long Term Evolution (LTE) positioning reference signals (PRS) transmitted by a base station in an LTE network in one or more frequency bands shared by the NR network using dynamic spectrum sharing (DSS);
means for receiving a muting pattern for the LTE PRS; and
means for receiving NR data signals and control signals transmitted by a base station in the NR network while the LTE PRS transmitted by the base station in the LTE network is muted.

38. The UE of clause 37, wherein the NR data signals and control signals transmitted by the base station in the NR network comprise at least one of physical downlink shared channel (PDSCH) transmissions, physical downlink common channel (PDCCH) transmissions, Synchronization Signal Block (SSB), or a combination thereof.

39. The UE of either of clauses 37 or 38, wherein the control signals transmitted by the base station in the NR network comprises a Synchronization Signal Block (SSB) and wherein the LTE PRS is muted for at least two symbols in a physical resource block (PRB) transmitted by the base station in the LTE network to leave at least four consecutive symbols available for SSB transmissions in the PRB transmitted by the base station in the NR network.

40. A non-transitory storage medium including program code stored thereon, the program code is operable to configure at least one processor in a user equipment (UE) for wireless communications with a New Radio (NR) network, comprising:

program code to transmit an indication to an entity in the NR network that the UE does not support rate matching around Long Term Evolution (LTE) positioning reference signals (PRS) transmitted by a base station in an LTE network in one or more frequency bands shared by the NR network using dynamic spectrum sharing (DSS);

program code to receive a muting pattern for the LTE PRS; and program code to receive NR data signals and control signals transmitted by a base station in the NR network while the LTE PRS transmitted by the base station in the LTE network is muted.

41. The non-transitory storage medium of clause 40, wherein the NR data signals and control signals transmitted by the base station in the NR network comprise at least one of physical downlink shared channel (PDSCH) transmissions, physical downlink common channel (PDCCH) transmissions, Synchronization Signal Block (SSB), or a combination thereof.

42. The non-transitory storage medium of either of clauses 40 or 41, wherein the control signals transmitted by the base station in the NR network comprises a Synchronization Signal Block (SSB) and wherein the LTE PRS is muted for at least two symbols in a physical resource block (PRB) transmitted by the base station in the LTE network to leave at least four consecutive symbols available for SSB transmissions in the PRB transmitted by the base station in the NR network.

43. A method for wireless communications performed by an entity in a New Radio (NR) network connected to an entity in a Long Term Evolution (LTE) Network and a user equipment (UE), comprising:

obtaining, from the entity in the LTE network, LTE positioning reference signal (PRS) configuration data for LTE PRS transmitted in one or more frequency bands shared by a base station in the NR network using dynamic spectrum sharing (DSS);

transmitting, to the UE connected to the base station in the NR network, LTE PRS rate matching information for the LTE PRS transmitted in the one or more frequency bands shared by the base station in the NR network;

transmitting NR data signals and control signals to the UE while the LTE PRS is transmitted by a base station in the LTE network on the one or more frequency bands;

wherein the UE receives and decodes the NR data signals and control signals by rate matching around the LTE PRS in accordance with the LTE PRS rate matching information.

44. The method of clause 43, wherein the NR data signals and control signals transmitted by the base station in the NR network comprise at least one of physical downlink shared channel (PDSCH) transmissions, physical downlink common channel (PDCCH) transmissions, Synchronization Signal Block (SSB) transmissions, or a combination thereof.

45. The method of either of clauses 43 or 44, wherein the LTE PRS rate matching information comprises an LTE PRS rate matching pattern.

46. The method of any of clauses 43-45, wherein the LTE PRS rate matching information comprises LTE PRS configuration data.

47. The method of clause 46, wherein the LTE PRS configuration data comprises one or more of carrier frequency, carrier bandwidth, a number of consecutive PRS sub-frames, a PRS periodicity, a PRS configuration index, a muting pattern, or a combination thereof.

48. The method of any of clauses 43-47, further comprising:

receiving an indication from the UE of a capability of rate matching around the LTE PRS in DSS, prior to transmitting the LTE PRS rate matching information to the UE.

49. The method of any of clauses 43-48, further comprising:

altering a muting pattern for the LTE PRS at least partly based on a Synchronization Signal Block (SSB) periodicity from the NR network;

transmitting the altered muting pattern to the UE; and transmitting SSB transmissions to the UE while the LTE PRS transmitted by the base station in the LTE network is muted.

50. The method of clause 49, wherein the LTE PRS is muted for at least two symbols in a physical resource block (PRB) transmitted by the base station in the LTE network to leave at least four consecutive symbols available for SSB transmissions in the PRB transmitted by the base station in the NR network.

51. The method of clause 49, wherein altering the muting pattern for the LTE PRS at least partly based on the SSB periodicity from the NR network comprises:

sending the SSB periodicity to the base station in the LTE network;

receiving the altered muting pattern from the base station in the LTE network.

52. An entity in a New Radio (NR) network connected to an entity in a Long Term Evolution (LTE) Network and a user equipment (UE), the entity in the NR network comprising:

an external interface configured to communicate with network entities in a wireless communication system;

at least one memory;

at least one processor coupled to the external interface and the at least one memory, wherein the at least one processor is configured to:

obtain, from the entity in the LTE network via the external interface, LTE positioning reference signal (PRS) configuration data for LTE PRS transmitted in one or more frequency bands shared by a base station in the NR network using dynamic spectrum sharing (DSS);

transmit via the external interface, to the UE connected to the base station in the NR network, LTE PRS rate matching information for the LTE PRS transmitted in the one or more frequency bands shared by the base station in the NR network;

transmit, via the external interface, NR data signals and control signals to the UE while the LTE PRS is transmitted by a base station in the LTE network on the one or more frequency bands;

wherein the UE receives and decodes the NR data signals and control signals by rate matching around the LTE PRS in accordance with the LTE PRS rate matching information.

53. The entity in the NR network of clause 52, wherein the NR data signals and control signals transmitted by the base station in the NR network comprise at least one of physical downlink shared channel (PDSCH) transmissions, physical downlink common channel (PDCCH) transmissions, Synchronization Signal Block (SSB) transmissions, or a combination thereof.

54. The entity in the NR network of either of clauses 52 or 53, wherein the LTE PRS rate matching information comprises an LTE PRS rate matching pattern.
55. The entity in the NR network of any of clauses 52-54, wherein the LTE PRS rate matching information comprises LTE PRS configuration data.
56. The entity in the NR network of clause 55, wherein the LTE PRS configuration data comprises one or more of carrier frequency, carrier bandwidth, a number of consecutive PRS sub-frames, a PRS periodicity, a PRS configuration index, a muting pattern, or a combination thereof.
57. The entity in the NR network of any of clauses 52-56, wherein the at least one processor is further configured to:
receive, via the external interface, an indication from the UE of a capability of rate matching around the LTE PRS in DSS, prior to transmitting the LTE PRS rate matching information to the UE.
58. The entity in the NR network of any of clauses 52-57, wherein the at least one processor is further configured to:
alter a muting pattern for the LTE PRS at least partly based on a Synchronization Signal Block (SSB) periodicity from the NR network;
transmit, via the external interface, the altered muting pattern to the UE; and
transmit, via the external interface, SSB transmissions to the UE while the LTE PRS transmitted by the base station in the LTE network is muted.
59. The entity in the NR network of clause 58, wherein the LTE PRS is muted for at least two symbols in a physical resource block (PRB) transmitted by the base station in the LTE network to leave at least four consecutive symbols available for SSB transmissions in the PRB transmitted by the base station in the NR network.
60. The entity in the NR network of clause 58, wherein the at least one processor is configured to alter the muting pattern for the LTE PRS at least partly based on the SSB periodicity from the NR network by being configured to:
send, via the external interface, the SSB periodicity to the base station in the LTE network;
receive, via the external interface, the altered muting pattern from the base station in the LTE network.
61. An entity in a New Radio (NR) network connected to an entity in a Long Term Evolution (LTE) Network and a user equipment (UE), the entity in the NR network comprising:
means for obtaining, from the entity in the LTE network, LTE positioning reference signal (PRS) configuration data for LTE PRS transmitted in one or more frequency bands shared by a base station in the NR network using dynamic spectrum sharing (DSS);
means for transmitting, to the UE connected to the base station in the NR network, LTE PRS rate matching information for the LTE PRS transmitted in the one or more frequency bands shared by the base station in the NR network;
means for transmitting NR data signals and control signals to the UE while the LTE PRS is transmitted by a base station in the LTE network on the one or more frequency bands;
wherein the UE receives and decodes the NR data signals and control signals by rate matching around the LTE PRS in accordance with the LTE PRS rate matching information.

62. The entity in the NR network of clause 61, wherein the NR data signals and control signals transmitted by the base station in the NR network comprise at least one of physical downlink shared channel (PDSCH) transmissions, physical downlink common channel (PDCCH) transmissions, Synchronization Signal Block (SSB) transmissions, or a combination thereof.
63. The entity in the NR network of either of clauses 61 or 62, wherein the LTE PRS rate matching information comprises an LTE PRS rate matching pattern.
64. The entity in the NR network of any of clauses 61-63, wherein the LTE PRS rate matching information comprises LTE PRS configuration data.
65. The entity in the NR network of any of clauses 61-64, further comprising:
means for receiving an indication from the UE of a capability of rate matching around the LTE PRS in DSS, prior to transmitting the LTE PRS rate matching information to the UE.
66. The entity in the NR network of any of clauses 61-65, further comprising:
means for altering a muting pattern for the LTE PRS at least partly based on a Synchronization Signal Block (SSB) periodicity from the NR network;
means for transmitting the altered muting pattern to the UE; and
means for transmitting SSB transmissions to the UE while the LTE PRS transmitted by the base station in the LTE network is muted.
67. A non-transitory storage medium including program code stored thereon, the program code is operable to configure at least one processor in an entity in a New Radio (NR) network connected to an entity in a Long Term Evolution (LTE) Network and a user equipment (UE), comprising:
program code to obtain, from the entity in the LTE network, LTE positioning reference signal (PRS) configuration data for LTE PRS transmitted in one or more frequency bands shared by a base station in the NR network using dynamic spectrum sharing (DSS);
program code to transmit, to the UE connected to the base station in the NR network, LTE PRS rate matching information for the LTE PRS transmitted in the one or more frequency bands shared by the base station in the NR network;
program code to transmit NR data signals and control signals to the UE while the LTE PRS is transmitted by a base station in the LTE network on the one or more frequency bands;
wherein the UE receives and decodes the NR data signals and control signals by rate matching around the LTE PRS in accordance with the LTE PRS rate matching information.
68. The non-transitory storage medium of clause 67, wherein the NR data signals and control signals transmitted by the base station in the NR network comprise at least one of physical downlink shared channel (PDSCH) transmissions, physical downlink common channel (PDCCH) transmissions, Synchronization Signal Block (SSB) transmissions, or a combination thereof.
69. The non-transitory storage medium of either of clauses 67 or 68, wherein the LTE PRS rate matching information comprises an LTE PRS rate matching pattern.

70. The non-transitory storage medium of any of clauses 67-69, wherein the LTE PRS rate matching information comprises LTE PRS configuration data.

71. The non-transitory storage medium of any of clauses 67-70, further comprising:
program code to receive an indication from the UE of a capability of rate matching around the LTE PRS in DSS, prior to transmitting the LTE PRS rate matching information to the UE.

72. The non-transitory storage medium of any of clauses 67-71, further comprising:
program code to alter a muting pattern for the LTE PRS at least partly based on a Synchronization Signal Block (SSB) periodicity from the NR network;
program code to transmit the altered muting pattern to the UE; and
program code to transmit SSB transmissions to the UE while the LTE PRS transmitted by the base station in the LTE network is muted.

73. A method for wireless communications performed by an entity in a New Radio (NR) network connected to an entity in a Long Term Evolution (LTE) Network and a user equipment (UE), comprising:
receiving an indication from the UE connected to the NR network that the UE does not support rate matching around LTE positioning reference signals (PRS) transmitted in one or more frequency bands shared by the NR network using dynamic spectrum sharing (DSS);
scheduling data transmissions and control transmissions from a base station in the NR network for when the LTE PRS is muted;
sending a muting pattern for the LTE PRS to the UE; and
transmitting NR data signals and control signals to the UE while the LTE PRS transmitted by the base station in the LTE network is muted.

74. The method of clause 73, wherein the NR data signals and control signals transmitted by the base station in the NR network comprise at least one of physical downlink shared channel (PDSCH) transmissions, physical downlink common channel (PDCCH) transmissions, Synchronization Signal Block (SSB), or a combination thereof.

75. The method of either of clauses 73 or 74, wherein the control signals transmitted by the base station in the NR network comprises a Synchronization Signal Block (SSB) and wherein the LTE PRS is muted for at least two symbols in a physical resource block (PRB) transmitted by the base station in the LTE network to leave at least four consecutive symbols available for SSB transmissions in the PRB transmitted by the base station in the NR network.

76. An entity in a New Radio (NR) network connected to an entity in a Long Term Evolution (LTE) Network and a user equipment (UE), the entity in the NR network comprising:
an external interface configured to communicate with network entities in a wireless communication system;
at least one memory;
at least one processor coupled to the external interface and the at least one memory, wherein the at least one processor is configured to:
receive, via the external interface, an indication from the UE connected to the NR network that the UE does not support rate matching around LTE positioning reference signals (PRS) transmitted in one or more frequency bands shared by the NR network using dynamic spectrum sharing (DSS);
schedule data transmissions and control transmissions from a base station in the NR network for when the LTE PRS is muted;
send, via the external interface, a muting pattern for the LTE PRS to the UE; and
transmit, via the external interface, NR data signals and control signals to the UE while the LTE PRS transmitted by the base station in the LTE network is muted.

77. The entity in the NR network of clause 76, wherein the NR data signals and control signals transmitted by the base station in the NR network comprise at least one of physical downlink shared channel (PDSCH) transmissions, physical downlink common channel (PDCCH) transmissions, Synchronization Signal Block (SSB), or a combination thereof.

78. The entity in the NR network of either of clauses 76 or 77, wherein the control signals transmitted by the base station in the NR network comprises a Synchronization Signal Block (SSB) and wherein the LTE PRS is muted for at least two symbols in a physical resource block (PRB) transmitted by the base station in the LTE network to leave at least four consecutive symbols available for SSB transmissions in the PRB transmitted by the base station in the NR network.

79. An entity in a New Radio (NR) network connected to an entity in a Long Term Evolution (LTE) Network and a user equipment (UE), the entity in the NR network comprising:
means for receiving an indication from the UE connected to the NR network that the UE does not support rate matching around LTE positioning reference signals (PRS) transmitted in one or more frequency bands shared by the NR network using dynamic spectrum sharing (DSS);
means for scheduling data transmissions and control transmissions from a base station in the NR network for when the LTE PRS is muted;
means for sending a muting pattern for the LTE PRS to the UE; and
means for transmitting NR data signals and control signals to the UE while the LTE PRS transmitted by the base station in the LTE network is muted.

80. The entity in the NR network of clause 41, wherein the NR data signals and control signals transmitted by the base station in the NR network comprise at least one of physical downlink shared channel (PDSCH) transmissions, physical downlink common channel (PDCCH) transmissions, Synchronization Signal Block (SSB), or a combination thereof.

81. The entity in the NR network of either of clauses 41 or 80, wherein the control signals transmitted by the base station in the NR network comprises a Synchronization Signal Block (SSB) and wherein the LTE PRS is muted for at least two symbols in a physical resource block (PRB) transmitted by the base station in the LTE network to leave at least four consecutive symbols available for SSB transmissions in the PRB transmitted by the base station in the NR network.

82. A non-transitory storage medium including program code stored thereon, the program code is operable to configure at least one processor in an entity in a New Radio (NR) network connected to an entity in a Long Term Evolution (LTE) Network and a user equipment (UE), comprising:
program code to receive an indication from the UE connected to the NR network that the UE does not support rate matching around LTE positioning reference signals (PRS) transmitted in one or more frequency bands shared by the NR network using dynamic spectrum sharing (DSS);
program code to schedule data transmissions and control transmissions from a base station in the NR network for when the LTE PRS is muted;
program code to send a muting pattern for the LTE PRS to the UE; and
program code to transmit NR data signals and control signals to the UE while the LTE PRS transmitted by the base station in the LTE network is muted.

83. The non-transitory storage medium of clause 82, wherein the NR data signals and control signals transmitted by the base station in the NR network comprise at least one of physical downlink shared channel (PDSCH) transmissions, physical downlink common channel (PDCCH) transmissions, Synchronization Signal Block (SSB), or a combination thereof.

84. The non-transitory storage medium of either of clauses 82 or 83, wherein the control signals transmitted by the base station in the NR network comprises a Synchronization Signal Block (SSB) and wherein the LTE PRS is muted for at least two symbols in a physical resource block (PRB) transmitted by the base station in the LTE network to leave at least four consecutive symbols available for SSB transmissions in the PRB transmitted by the base station in the NR network.

Therefore, it is intended that claimed subject matter not be limited to the particular examples disclosed, but that such claimed subject matter may also include all aspects falling within the scope of appended claims, and equivalents thereof.

What is claimed is:

1. A method for wireless communications performed by a user equipment (UE) connected to a New Radio (NR) network, the method comprising:
    receiving, from an entity in the NR network, an NR signal comprising Long Term Evolution (LTE) positioning reference signal (PRS) rate matching information for dynamic LTE PRS transmitted by a first base station in an LTE network in one or more frequency bands shared by the NR network using dynamic spectrum sharing (DSS), wherein the LTE PRS rate matching information comprises an LTE PRS rate matching pattern;
    receiving NR data signals and control signals transmitted by a second base station in the NR network and the dynamic LTE PRS transmitted by the first base station in the LTE network on the one or more frequency bands; and
    decoding and processing the NR data signals and control signals from the second base station in the NR network by rate matching around the dynamic LTE PRS in accordance with the LTE PRS rate matching information, wherein rate matching around the dynamic LTE PRS in accordance with the LTE PRS rate matching information comprises applying the LTE PRS rate matching pattern to the NR data signals and control signals to receive NR data.

2. The method of claim 1, wherein the NR data signals and control signals transmitted by the second base station in the NR network comprise at least one of physical downlink shared channel (PDSCH) transmissions, physical downlink common channel (PDCCH) transmissions, Synchronization Signal Block (SSB) transmissions, or a combination thereof.

3. The method of claim 1, wherein the LTE PRS rate matching information comprises LTE PRS configuration data to enable the UE to perform PRS positioning measurements.

4. The method of claim 3, wherein the LTE PRS configuration data comprises one or more of carrier frequency, carrier bandwidth, a number of consecutive PRS sub-frames, a PRS periodicity, a PRS configuration index, a muting pattern, or a combination thereof.

5. The method of claim 1, further comprising:
    transmitting an indication to the entity in the NR network of a capability of rate matching around the dynamic LTE PRS in DSS, prior to receiving the LTE PRS rate matching information.

6. The method of claim 1, further comprising:
    receiving a muting pattern for the dynamic LTE PRS or a regularly scheduled LTE PRS in the LTE PRS rate matching information, wherein the muting pattern is at least partly based on a Synchronization Signal Block (SSB) periodicity from the NR network; and
    receiving SSB transmissions from the second base station in the NR network while the dynamic LTE PRS or the regularly scheduled LTE PRS transmitted by the first base station in the LTE network is muted.

7. The method of claim 6, further comprising:
    muting the dynamic LTE PRS or the regularly scheduled LTE PRS for at least two symbols in a physical resource block (PRB) transmitted by the first base station in the LTE network to leave at least four consecutive symbols available for SSB transmissions in the PRB transmitted by the second base station in the NR network.

8. A user equipment (UE) configured for wireless communications with a New Radio (NR) network, the UE comprising:
    a wireless transceiver configured to wirelessly communicate with network entities in a wireless communication system;
    at least one memory; and
    at least one processor coupled to the wireless transceiver and the at least one memory, wherein the at least one processor is configured to:
        receive, from an entity in the NR network via the wireless transceiver, an NR signal comprising Long Term Evolution (LTE) positioning reference signal (PRS) rate matching information for dynamic LTE PRS transmitted by a first base station in an LTE network in one or more frequency bands shared by the NR network using dynamic spectrum sharing (DSS), wherein the LTE PRS rate matching information comprises an LTE PRS rate matching pattern;
        receive, via the wireless transceiver, NR data signals and control signals transmitted by a second base station in the NR network and the dynamic LTE PRS transmitted by the first base station in the LTE network on the one or more frequency bands; and
        decode and process the NR data signals and control signals from the second base station in the NR network, wherein, to decode and process the NR data signals and control signals from the second base station in the NR network, the at least one processor is configured to rate match around the dynamic LTE PRS in accordance with the LTE PRS rate matching information, wherein, to rate match around the dynamic LTE PRS in accordance with the LTE PRS rate matching information, the at least one processor is configured to apply the LTE PRS rate matching pattern to the NR data signals and control signals to receive NR data.

9. The UE of claim 8, wherein the NR data signals and control signals transmitted by the second base station in the NR network comprise at least one of physical downlink shared channel (PDSCH) transmissions, physical downlink common channel (PDCCH) transmissions, Synchronization Signal Block (SSB) transmissions, or a combination thereof.

10. The UE of claim 8, wherein the LTE PRS rate matching information comprises LTE PRS configuration data to enable the UE to perform PRS positioning measurements.

11. The UE of claim 10, wherein the LTE PRS configuration data comprises one or more of carrier frequency, carrier bandwidth, a number of consecutive PRS sub-frames, a PRS periodicity, a PRS configuration index, a muting pattern, or a combination thereof.

12. The UE of claim 8, wherein the at least one processor is further configured to:
transmit, via the wireless transceiver, an indication to the entity in the NR network of a capability of rate matching around the dynamic LTE PRS in DSS, prior to receiving the LTE PRS rate matching information.

13. The UE of claim 8, wherein the at least one processor is further configured to:
receive, via the wireless transceiver, a muting pattern for the dynamic LTE PRS or a regularly scheduled LTE PRS in the LTE PRS rate matching information, wherein the muting pattern is at least partly based on a Synchronization Signal Block (SSB) periodicity from the NR network; and
receive, via the wireless transceiver, SSB transmissions from the second base station in the NR network while the dynamic LTE PRS or the regularly scheduled LTE PRS transmitted by the first base station in the LTE network is muted.

14. The UE of claim 13, wherein the at least one processor is further configured to:
mute the dynamic LTE PRS or the regularly scheduled LTE PRS for at least two symbols in a physical resource block (PRB) transmitted by the first base station in the LTE network to leave at least four consecutive symbols available for SSB transmissions in the PRB transmitted by the second base station in the NR network.

15. A user equipment (UE) configured for wireless communications with a New Radio (NR) network, the UE comprising:
means for receiving, from an entity in the NR network, an NR signal comprising Long Term Evolution (LTE) positioning reference signal (PRS) rate matching information for dynamic LTE PRS transmitted by a first base station in an LTE network in one or more frequency bands shared by the NR network using dynamic spectrum sharing (DSS), wherein the LTE PRS rate matching information comprises an LTE PRS rate matching pattern;
means for receiving NR data signals and control signals transmitted by a second base station in the NR network and the dynamic LTE PRS transmitted by the base station in the LTE network on the one or more frequency bands; and
means for decoding and processing the NR data signals and control signals from the second base station in the NR network configured to rate match around the dynamic LTE PRS in accordance with the LTE PRS rate matching information, wherein the means for rate matching around the dynamic LTE PRS in accordance with the LTE PRS rate matching information is configured to apply the LTE PRS rate matching pattern to the NR data signals and control signals to receive NR data.

16. The UE of claim 15, wherein the NR data signals and control signals transmitted by the second base station in the NR network comprise at least one of physical downlink shared channel (PDSCH) transmissions, physical downlink common channel (PDCCH) transmissions, Synchronization Signal Block (SSB) transmissions, or a combination thereof.

17. The UE of claim 15, wherein the LTE PRS rate matching information comprises LTE PRS configuration data to enable the UE to perform PRS positioning measurements.

18. The UE of claim 17, wherein the LTE PRS configuration data comprises one or more of carrier frequency, carrier bandwidth, a number of consecutive PRS sub-frames, a PRS periodicity, a PRS configuration index, a muting pattern, or a combination thereof.

19. The UE of claim 15, further comprising:
means for transmitting an indication to the entity in the NR network of a capability of rate matching around the dynamic LTE PRS in DSS, prior to receiving the LTE PRS rate matching information.

20. The UE of claim 15, further comprising:
means for receiving a muting pattern for the dynamic LTE PRS or a regularly scheduled LTE PRS in the LTE PRS rate matching information, wherein the muting pattern is at least partly based on a Synchronization Signal Block (SSB) periodicity from the NR network; and
means for receiving SSB transmissions from the second base station in the NR network while the dynamic LTE PRS or the regularly scheduled LTE PRS transmitted by the first base station in the LTE network is muted.

21. The UE of claim 20, further comprising:
means for muting the dynamic LTE PRS or the regularly scheduled LTE PRS for at least two symbols in a physical resource block (PRB) transmitted by the first base station in the LTE network to leave at least four consecutive symbols available for SSB transmissions in the PRB transmitted by the second base station in the NR network.

22. A non-transitory storage medium including program code stored thereon, the program code is operable to configure at least one processor in a user equipment (UE) for wireless communications with a New Radio (NR) network, the UE comprising:
program code to receive, from an entity in the NR network, an NR signal comprising Long Term Evolution (LTE) positioning reference signal (PRS) rate matching information for dynamic LTE PRS transmitted by a first base station in an LTE network in one or more frequency bands shared by the NR network using dynamic spectrum sharing (DSS), wherein the LTE PRS rate matching information comprises an LTE PRS rate matching pattern;
program code to receive NR data signals and control signals transmitted by a second base station in the NR network and the dynamic LTE PRS transmitted by the first base station in the LTE network on the one or more frequency bands; and
program code to decode and process the NR data signals and control signals from the second base station in the NR network, wherein the program code to decode and process the NR data signals and control signals from the second base station in the NR network is configured to rate match around the dynamic LTE PRS in accordance with the LTE PRS rate matching information, wherein the program code to rate match around the dynamic LTE PRS in accordance with the LTE PRS rate matching information is configured to apply the LTE PRS rate matching pattern to the NR data signals and control signals to receive NR data.

23. The non-transitory storage medium of claim 22, wherein the NR data signals and control signals transmitted by the second base station in the NR network comprise at least one of physical downlink shared channel (PDSCH) transmissions, physical downlink common channel (PDCCH) transmissions, Synchronization Signal Block (SSB) transmissions, or a combination thereof.

24. The non-transitory storage medium of claim 22, wherein the LTE PRS rate matching information comprises LTE PRS configuration data to enable the UE to perform PRS positioning measurements.

25. The non-transitory storage medium of claim 22, wherein the UE comprises program code to:
    transmit an indication to the entity in the NR network of a capability of rate matching around the dynamic LTE PRS in DSS, prior to receiving the LTE PRS rate matching information.

26. The non-transitory storage medium of claim 22, wherein the UE comprises program code to:
    receive a muting pattern for the dynamic LTE PRS or a regularly scheduled LTE PRS in the LTE PRS rate matching information, wherein the muting pattern is at least partly based on a Synchronization Signal Block (SSB) periodicity from the NR network; and
    receive SSB transmissions from the second base station in the NR network while the dynamic LTE PRS or the regularly scheduled LTE PRS transmitted by the first base station in the LTE network is muted.

* * * * *